(12) United States Patent
Hatta et al.

(10) Patent No.: US 10,263,278 B2
(45) Date of Patent: *Apr. 16, 2019

(54) BATTERY, ELECTROLYTE, BATTERY PACK, ELECTRONIC APPARATUS, ELECTRICALLY DRIVEN VEHICLE, ELECTRICAL STORAGE DEVICE, AND ELECTRIC POWER SYSTEM

(71) Applicant: Murata Manufacturing Co., Ltd., Kyoto (JP)

(72) Inventors: Kazuhito Hatta, Fukushima (JP); Keiichi Kagami, Fukushima (JP); Nobuaki Shimosaka, Fukushima (JP); Keizo Koga, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 199 days.

This patent is subject to a terminal disclaimer.

(21) Appl. No.: 15/031,064

(22) PCT Filed: Aug. 28, 2014

(86) PCT No.: PCT/JP2014/004415
§ 371 (c)(1),
(2) Date: Apr. 21, 2016

(87) PCT Pub. No.: WO2015/068324
PCT Pub. Date: May 14, 2015

(65) Prior Publication Data
US 2016/0248115 A1 Aug. 25, 2016

(30) Foreign Application Priority Data
Nov. 5, 2013 (JP) ................. 2013-229672

(51) Int. Cl.
*H01M 10/056* (2010.01)
*H01M 10/0585* (2010.01)
(Continued)

(52) U.S. Cl.
CPC ....... *H01M 10/056* (2013.01); *B60L 11/1851* (2013.01); *H01M 10/052* (2013.01);
(Continued)

(58) Field of Classification Search
CPC ........... H01M 10/056; H01M 10/0525; H01M 10/0585; H01M 10/052; H01M 2220/20;
(Continued)

(56) References Cited

U.S. PATENT DOCUMENTS

2007/0256731 A1* 11/2007 Hayase ................ H01G 9/2009
 136/252
2009/0030100 A1* 1/2009 Nagamatsu ............ C01B 25/32
 521/142
(Continued)

FOREIGN PATENT DOCUMENTS

CN 102655244 A 9/2012
DE 19959430 A1 1/2001
(Continued)

OTHER PUBLICATIONS

Extended European Search Report of EP Patent Application No. 14859812.1, dated May 30, 2017, 11 pages.
(Continued)

*Primary Examiner* — Alexander Usyatinsky
(74) *Attorney, Agent, or Firm* — Chip Law Group

(57) ABSTRACT

Provided is a battery including a positive electrode, a negative electrode, a separator, and an electrolyte that contains particles, a resin, and an electrolytic solution. The shape of the particles includes a plane, a plane rate of the particles is greater than 40% and equal to or less than 100%,
(Continued)

and a refractive index of the particles is equal to or greater than 1.3 and less than 2.4.

19 Claims, 11 Drawing Sheets

(51) Int. Cl.
    *H01M 10/052*     (2010.01)
    *B60L 11/18*     (2006.01)
    *H01M 10/0525*     (2010.01)

(52) U.S. Cl.
    CPC ... *H01M 10/0525* (2013.01); *H01M 10/0585* (2013.01); *H01M 2220/20* (2013.01); *H01M 2300/002* (2013.01); *H01M 2300/0025* (2013.01); *H01M 2300/0082* (2013.01); *Y02E 60/122* (2013.01); *Y02T 10/7011* (2013.01)

(58) Field of Classification Search
    CPC ... H01M 2300/002; H01M 2300/0025; H01M 2300/0082; B60L 11/18; B60L 11/1851; Y02T 10/7011; Y02E 60/122
    See application file for complete search history.

(56) References Cited

U.S. PATENT DOCUMENTS

2012/0058398 A1*    3/2012    Balaji ............... H01M 10/0565
                                                      429/303
2012/0225328 A1*    9/2012    Nakanouchi .......... B60L 11/007
                                                      429/7
2013/0054061 A1*    2/2013    Nishimoto .......... H01M 2/1653
                                                      701/22
2014/0315091 A1*    10/2014    Yamazaki ............. H01M 4/621
                                                    429/231.8

FOREIGN PATENT DOCUMENTS

| EP | 2978047 A1 | | 1/2016 |
|---|---|---|---|
| JP | 2004-014373 A | | 1/2004 |
| JP | 2004-327422 A | | 11/2004 |
| JP | 2004-327423 A | | 11/2004 |
| JP | 2010-198757 A | | 9/2010 |
| JP | 2011-054519 A | | 3/2011 |
| JP | 2011-210433 A | | 10/2011 |
| WO | WO2013062991 | * | 5/2013 |
| WO | 2013/108510 A1 | | 7/2013 |

OTHER PUBLICATIONS

Rifat A.M. Hikmet, "New Lithium-ion Polymer Battery Concept for Increased Capacity", Journal of Power Sources vol. 92, 2001, pp. 212-220.

Office Action for CN Patent Application No. 201480059245.X, dated Nov. 16, 2018, 04 pages of Office Action and 06 pages of English Translation.

* cited by examiner

FIG. 2
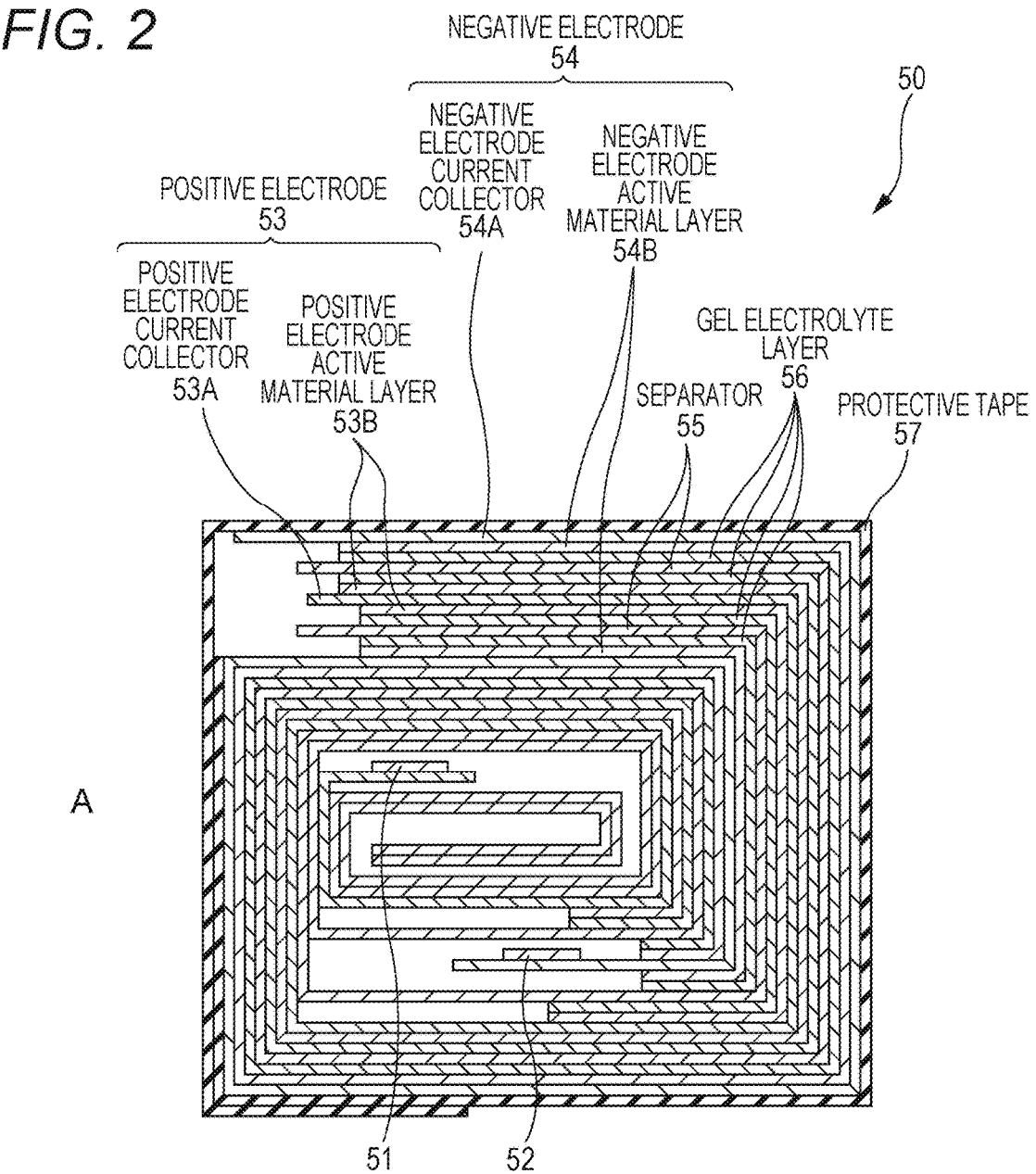
A
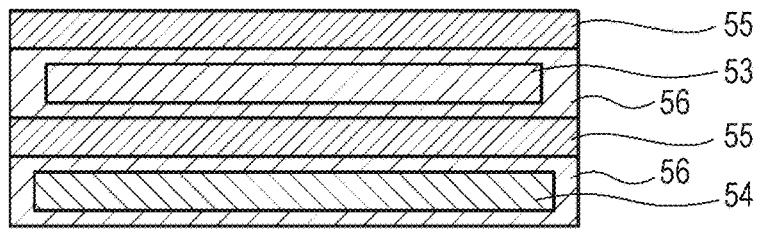
B

FIG. 3
A
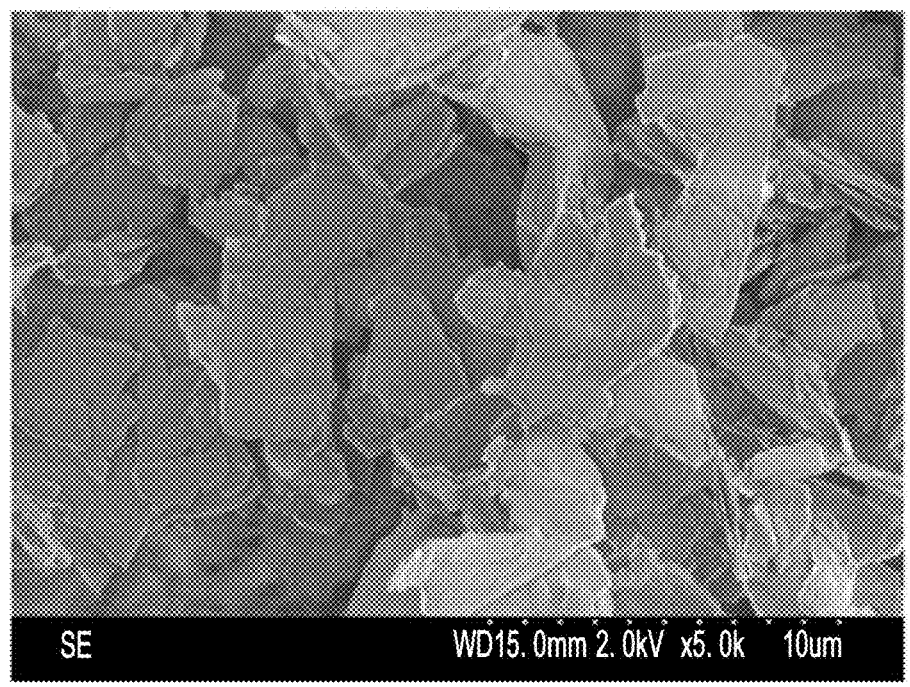
B
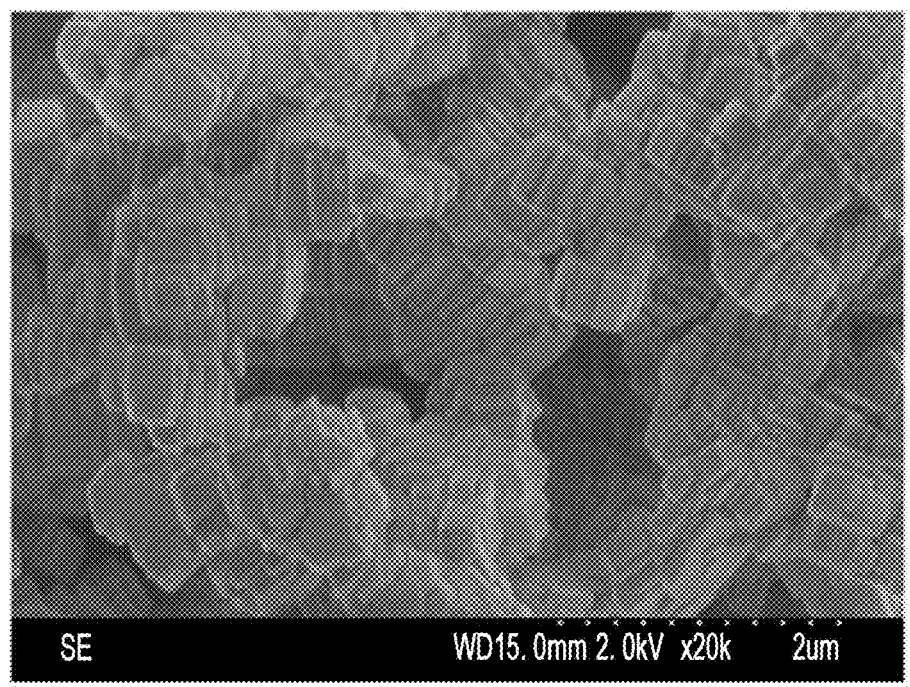

FIG. 6
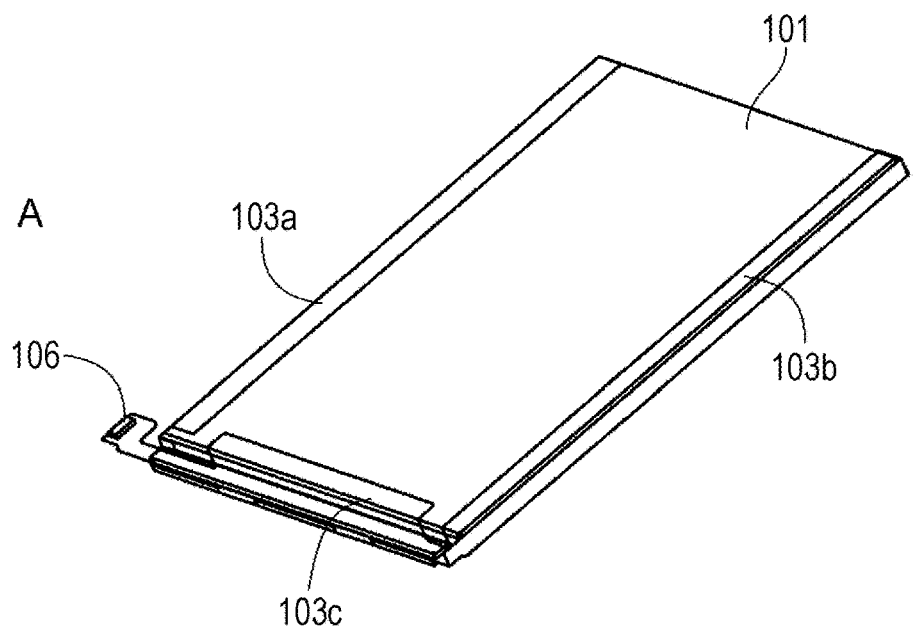
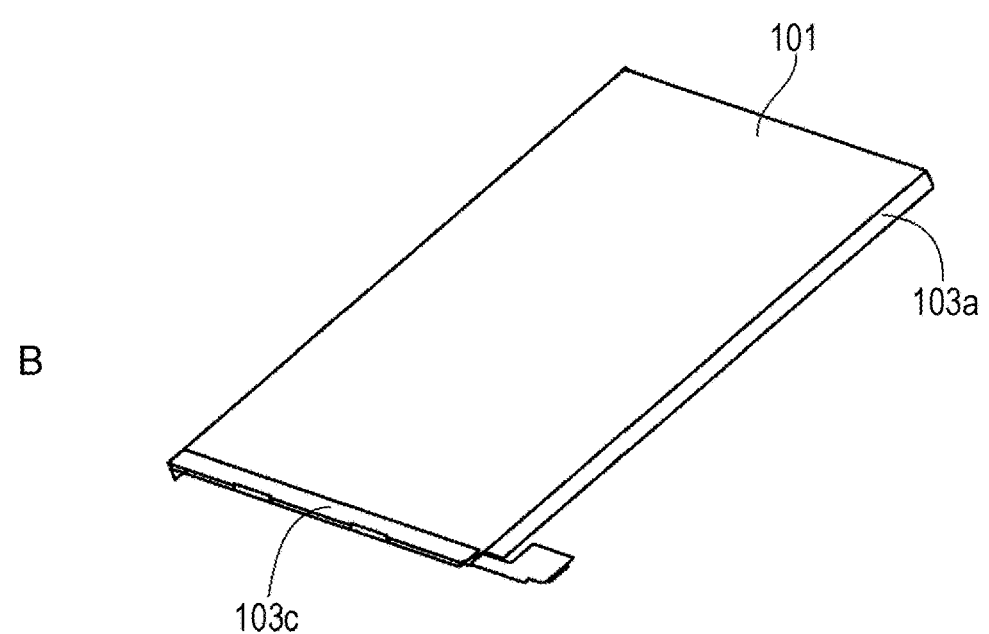

BATTERY, ELECTROLYTE, BATTERY PACK, ELECTRONIC APPARATUS, ELECTRICALLY DRIVEN VEHICLE, ELECTRICAL STORAGE DEVICE, AND ELECTRIC POWER SYSTEM

CROSS REFERENCE TO RELATED APPLICATIONS

This application is a U.S. National Phase of International Patent Application No. PCT/JP2014/004415 filed on Aug. 28, 2014, which claims priority benefit of Japanese Patent Application No. JP 2013-229672 filed in the Japan Patent Office on Nov. 5, 2013. Each of the above-referenced applications is hereby incorporated herein by reference in its entirety.

TECHNICAL FIELD

The present technology relates to a battery, an electrolyte, a battery pack, an electronic apparatus, an electrically driven vehicle, an electrical storage device, and an electric power system.

BACKGROUND ART

As lithium ion secondary batteries which are excellent in an energy density and are spread for a portable apparatus, batteries, in which a laminated film is used for an exterior packaging member, have been put into practical use because the energy density of the batteries is high at a light weight, and the batteries can be manufactured in a very thin shape.

In addition, in the batteries in which the laminated film is used as the exterior packaging member as described above, an electrolytic solution and a polymer compound are used as an electrolyte so as to obtain liquid leakage resistance and the like, and the batteries are known as polymer batteries. Among these batteries, a battery that uses a gel electrolyte, in which an electrolytic solution is retained by a polymer compound and has a so-called gel shape, is widely spread.

In a polymer battery, since an aluminum laminated film is used as the exterior packaging member, the degree of freedom in shape is greatly improved. However, strength is not sufficient in some cases. Therefore, when a strong force is applied thereto due to improper use, deformation is likely to occur.

In this case, when the polymer battery is covered with a strong exterior pack, there is no problem. However, the exterior pack becomes simple in accordance with a demand for a recent high capacity. Therefore, when the deformation is great, short-circuit is likely to occur at the inside of the battery, and there is a possibility that the battery does not function as a battery.

In contrast, Patent Document 1 suggests that particles of alumina and the like are mixed in a gel electrolyte to improve the strength of the gel.

CITATION LIST

Patent Document

Patent Document 1: Japanese Patent Application Laid-Open No. 2010-198757

SUMMARY OF THE INVENTION

Problems to be Solved by the Invention

In a battery in which the particles are mixed in the electrolyte, white turbidity and the like occur in the electrolyte. Therefore, it is difficult to secure stability without sacrificing a capacity.

Accordingly, an object of the present technology is to provide a battery that is capable of securing stability without sacrificing a capacity, an electrolyte, a battery pack, an electronic apparatus, an electrically driven vehicle, an electrical storage device, and an electric power system.

Solutions to Problems

To solve the above-described problem, according to the present technology, there is provided a battery including a positive electrode, a negative electrode, a separator, and an electrolyte that contains particles, a resin, and an electrolytic solution. A shape of the particles includes a plane, a plane rate of the particles is greater than 40% and equal to or less than 100%, and a refractive index of the particles is equal to or greater than 1.3 and less than 2.4.

According to the present technology, there is provided an electrolyte containing particles, a resin, and an electrolytic solution. A shape of the particles includes a plane, a plane rate of the particles is greater than 40% and equal to or less than 100%, and a refractive index of the particles is equal to or greater than 1.3 and less than 2.4.

According to the present technology, there are provided a battery pack, an electronic apparatus, an electrically driven vehicle, an electrical storage device, and an electric power system which include the above-described battery.

Effects of the Invention

According to the present technology, it is possible to secure stability without sacrificing a capacity.

BRIEF DESCRIPTION OF DRAWINGS

FIG. 2A is a cross-sectional view illustrating a cross-sectional configuration along line I-I in a wound electrode body illustrated in FIG. 1. FIG. 2B is a schematic cross-sectional view illustrating a part of a cross-section along a direction perpendicular to line I-I in the wound electrode body.

FIG. 3A is a SEM photograph of talc particles. FIG. 3B is a SEM photograph of boehmite particles.

FIG. 6A is a schematic perspective view illustrating external appearance of the simple type battery pack. FIG. 6B is a schematic perspective view illustrating external appearance of the simple type battery pack.

Figure 1:
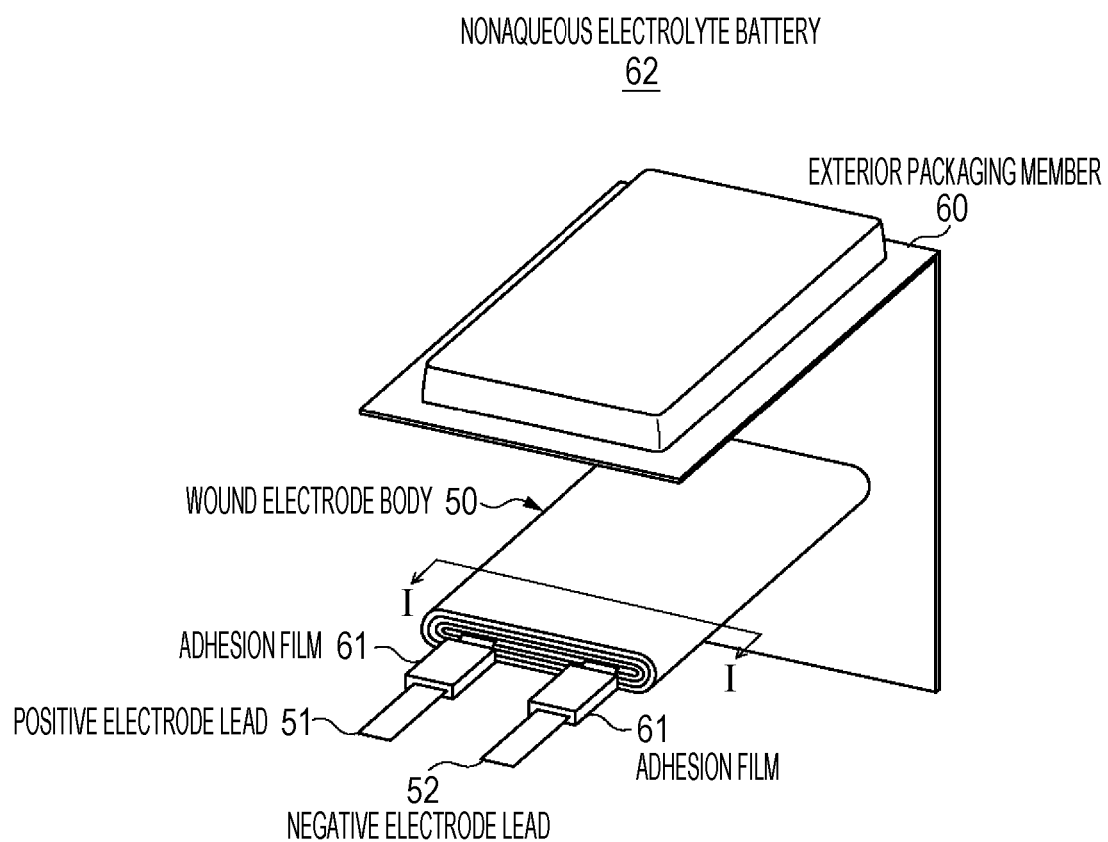
FIG. 1 is an exploded perspective view illustrating a configuration of a laminated film type nonaqueous electrolyte battery according to a first embodiment of the present technology.

MODE FOR CARRYING OUT THE INVENTION (Technical Background of Present Technology)

First, description will be given of the technical background of the present technology for easy understanding of the present technology. As described in the column of [BACKGROUND ART], Patent Document 1 (Japanese Patent Application Laid-Open No. 2010-198757) suggests that particles of alumina and the like are mixed in the gel electrolyte to improve the strength of the gel electrolyte.

When manufacturing the battery described in Patent Document 1, the following method and the like are employed. Specifically, a gel electrolyte (gel electrolyte that is made to have a sol shape by using a solvent, or gel electrolyte that is melted with heat to have a hot-melt shape), which is made to have flowability in advance, is formed on an electrode (or a separator) and is solidified. Then, the electrode and the separator are laminated and/or wound to obtain a power generation element (a wound electrode body or a laminated electrode body).

When forming the power generation element, the gel electrolyte is applied to the entire surface of at least an active material mixture layer (active material layer), and it is particularly important to sufficiently supply the gel electrolyte to a cut-out cross-section including the active material mixture layer of an electrode. The reason for this is as follows. When the electrolyte is deficient, a portion, which does not contribute to a charge reaction, may cause a loss in a possible capacity, and may cause a burr that occurs on a cut-out cross-section, a conductive that is detached, elution of metal ions due to a high-potential application phenomenon, and the like. As a result, short-circuit accident may be caused.

However, when it is tried to sufficiently apply the gel electrolyte, in which particles of alumina and the like are mixed in, to the cut-out cross-section of the electrode, a gel electrolyte layer having a width wider than that of the electrode is formed. Therefore, it enters a state in which the gel electrolyte layer protrudes from width-direction both ends of the electrode in a width direction. When it enters this state after application, white turbidity and the like occur in the gel electrolyte in which the particles of alumina and the like are mixed in. Therefore, it is difficult to discriminate the contour of the electrode through the gel electrode.

Therefore, when forming the power generation element, it is difficult to accurately overlap a positive electrode edge, a separator edge, and a negative electrode edge with an appropriate clearance (gap between respective edges in a width direction). When laminating or winding the electrode and the separator, it is important to accurately overlap the positive electrode edge, the separator edge, and the negative electrode edge at an appropriate clearance, and a positional deviation from the appropriate clearance becomes a cause for a serious short-circuit accident. Therefore, it is necessary to avoid the positional deviation.

In contrast, in a case of using the gel electrolyte in which the particles of alumina and the like are mixed in, when setting the clearance to a great value, the possibility of the short-circuit decreases. Accordingly, for example, a method, in which the size of the positive electrode is made small (the width of the positive electrode is made small), is employed. However, in the method, a battery capacity is reduced, and thus the capacity deteriorates. That is, it is possible to secure stability, but the capacity is sacrificed.

In consideration of the above-described problem, the present technology provides a battery that is capable of securing stability without sacrificing the capacity by improving transparency of the gel electrolyte, an electrolyte, a battery pack, an electronic apparatus, an electrically driven vehicle, an electrical storage device, and an electric power system.

Hereinafter, embodiments of the present technology will be described with reference to the accompanying drawings. Furthermore, description will be made in the following order:

1. First Embodiment (First Example and Second Example of Battery)
2. Second Embodiment (Example of Battery Pack)
3. Third Embodiment (Example of Battery Pack)
4. Fourth Embodiment (Example of Electrical Storage System and the Like)
5. Other Embodiments (Modification Examples)

On the other hand, the following embodiments and the like are preferred specific examples of the present technology, and the content of the present technology is not limited by the embodiments or the like. In addition, effects described in this specification are illustrative only, and there is no limitation thereto. In addition, it is not intended to deny existence of other effects different from effects which are exemplified.

1. First Embodiment

In a first embodiment of the present technology, description will be given of a laminated film type nonaqueous electrolyte battery (battery). For example, the nonaqueous electrolyte battery is a nonaqueous electrolyte secondary battery capable of being charged and discharged. In addition, the nonaqueous electrolyte battery is, for example, a lithium ion secondary battery. In the following description, two configuration examples (a first example and a second example) of the laminated film type nonaqueous electrolyte battery will be described.

(1-1) First Example

Configuration Example of Nonaqueous Electrolyte Battery

FIG. 1 illustrates a configuration of a nonaqueous electrolyte battery 62 according to the first embodiment. The nonaqueous electrolyte battery 62 is called a so-called laminated film type, and a wound electrode body 50, to which a positive electrode lead 51 and a negative electrode lead 52 are attached, is accommodated at the inside of a film-shaped exterior packaging member 60.

The positive electrode lead 51 and the negative electrode lead 52 are led out from the inside of the exterior packaging member 60 toward an outer side, for example, in the same direction. For example, the positive electrode lead 51 and the negative electrode lead 52 are constituted by a metallic material such as aluminum, copper, nickel, and stainless steel, and have a thin plate shape or a network shape.

For example, the exterior packaging member 60 is constituted by a laminated film in which a resin layer is formed on both surfaces of the metallic layer. In the laminated film, an outer side resin layer is formed on a surface of the metallic layer which is exposed to an outer side of a battery, and an inner side resin layer is formed on a surface, which faces power generation elements such as a wound electrode body 50, on an inner side of the battery.

The metallic layer has the most important function of blocking entrance of moisture, oxygen, and light to protect the contents, and aluminum (Al) is most commonly used to form the metallic layer from the viewpoints of lightness, extensibility, price, and easy processing. The outer side resin layer has beauty in exterior appearance, toughness, flexibility, and the like, and a resin material such as nylon or polyethylene terephthalate (PET) is used to form the outer side resin layer. The inner side resin layer is a portion to be melted and fused with each other with heat or ultrasonic waves, and thus polyolefin is preferable for the inner side resin layer, and casted polypropylene (CPP) is frequently used. An adhesive layer may be provided between the metallic layer and the outer side resin layer and between the metallic layer and the inner side resin layer, respectively, according to necessity.

In the exterior packaging member 60, a concave portion, which is formed, for example, through deep drawing in a direction toward the outer side resin layer from the inner side resin layer and accommodates the wound electrode body 50, is provided, and the inner side resin layer is disposed to face the wound electrode body 50. Inner side resin layers, which face each other, of exterior packaging member 60 are brought into close contact with each other at outer edge portions of the concave portion through fusion and the like. An adhesion film 61, which improves adhesiveness between the inner side resin layer of the exterior packaging member 60 and the positive electrode lead 51 and the negative electrode lead 52 which are formed from a metallic material, is disposed between the exterior packaging member 60, and the positive electrode lead 51 and between the exterior packaging member 60 and the negative electrode lead 52, respectively. The adhesion film. 61 is formed from a resin material having a high adhesiveness with a metallic material. For example, the adhesion film 61 is formed from a polyolefin resin such as polyethylene, polypropylene, and modified polyethylene or modified polypropylene which is modified from the polyethylene or the polypropylene.

Furthermore, instead of an aluminum laminated film in which the metallic layer is formed from aluminum (Al), the exterior packaging member 60 may be formed from a laminated film having a different structure, a polymeric film such as polypropylene, or a metallic film.

FIG. 2A is a cross-sectional view illustrating a cross-sectional structure along line I-I in the wound electrode body 50 illustrated in FIG. 1. FIG. 2B is a schematic cross-sectional view illustrating a part of a cross-section along a direction perpendicular to line I-I in the wound electrode body 50. As illustrated in FIG. 2A, the wound electrode body 50 is obtained by laminating a strip-shaped positive electrode 53 and a strip-shaped negative electrode 54 through a strip-shaped separator 55 and a gel electrolyte layer 56 and by winding the resultant laminated body, and the outermost peripheral portion thereof is protected by a protective tape 57 as necessary.

As illustrated in FIG. 2B, for example, a magnitude relationship between a width of the strip-shaped positive electrode 53, a width of the strip-shaped negative electrode 54, and a width of the strip-shaped separator 55 is typically set to satisfy a relationship of the width of the strip-shaped positive electrode 53< the width of the strip-shaped negative electrode 54< the width of the strip-shaped separator 55. The gel electrolyte layer 56 is formed in a width that is wider than the width of the strip-shaped positive electrode 53 and the width of the strip-shaped negative electrode 54, and covers at least a part of both end surfaces of the strip-shaped positive electrode 53 in a width direction, and at least a part of both end surfaces of the strip-shaped negative electrode 54 in a width direction. On the other hand, it is preferable that the gel electrolyte layer 56 covers the entirety of the both end surfaces of the positive electrode 53 and the both end surfaces of the negative electrode 54. In addition, the positive electrode 53, the negative electrode 54, and the separator 55 are laminated through the gel electrolyte layer 56, which is formed therebetween, in such a manner that a predetermined appropriate clearance is formed between the end of the positive electrode 53, the end of the negative electrode 54, and the end of the separator 55 in a width direction.

[Positive Electrode]

The positive electrode 53 has a structure in which a positive electrode active material layer 53B is provided on one surface or both surfaces of a positive electrode current collector 53A.

In the positive electrode 53, the positive electrode active material layer 53B that contains a positive electrode active material is formed on both surfaces of the positive electrode current collector 53A. As the positive electrode current collector 53A, for example, metal foil such as aluminum (Al) foil, nickel (Ni) foil, and stainless steel (SUS) foil can be used.

The positive electrode active material layer 53B contains, for example, a positive electrode active material, a conductive agent, and a binding agent. As the positive electrode active material, any one or more kinds of positive electrode materials, which are capable of intercalating and deintercalating lithium, can be used, and the positive electrode active material layer 53B may contain other materials such as a binding agent and a conductive agent as necessary.

As the positive electrode material capable of intercalating and deintercalating lithium, for example, a lithium-containing compound is preferable. The reason for this is that a high energy density is obtained. Examples of the lithium-containing compound include a composite oxide that contains lithium and a transition metal element, a phosphate compound that contains lithium and a transition metal element, and the like. Among these, a lithium-containing compound, which contains at least one kind selected from the group consisting of cobalt (Co), nickel (Ni), manganese (Mn), and iron (Fe) as the transition metal element, is preferable. The reason for this is that a higher voltage is obtained.

As a positive electrode material, for example, a lithium-containing compound expressed by $Li_xM1O_2$ or $Li_yM2PO_4$ can be used. In the formula, M1 and M2 represent one or more kinds of transition metal elements. Values of x and y are different in accordance with a charge and discharge state of a battery. Typically, the values of x and y satisfy relationships of $0.05 \leq x \leq 1.10$ and $0.05 \leq y \leq 1.10$. Examples of the composite oxide that contains lithium and a transition metal element include a lithium-cobalt composite oxide ($Li_xCoO_2$), a lithium-nickel composite oxide ($Li_xNiO_2$), a lithium-nickel-cobalt composite oxide ($Li_xNi_{1-z}Co_zO_2$ (0<z<1)), a lithium-nickel-cobalt-manganese composite oxide ($Li_xNi_{(1-v-w)}Co_vMn_wO_2$ (0<v+w<1, v>0, w>0)), a lithium-manganese composite oxide ($LiMn_2O_4$) or a lithium-manganese-nickel composite oxide ($LiMn_{2-t}Ni_tO_4$ ($0<t<2$)) which has a spinel type structure, and the like. Among these, the composite oxide that contains cobalt is preferable. The reason for this is that a high capacity is obtained, and excellent cycle characteristics are also obtained. In addition, examples of the phosphate compound that contains lithium and a transition metal element include a lithium-iron phosphate compound ($LiFePO_4$), a lithium-iron-manganese phosphate compound ($LiFe_{1-u}Mn_uPO_4$ ($0<u<1$)), and the like.

Specific examples of the lithium composite oxide include a lithium cobaltate ($LiCoO_2$), a lithium nickelate ($LiNiO_2$), a lithium manganate ($LiMn_2O_4$), and the like. In addition, a solid-solution in which a part of transition metal elements is substituted with other elements can be used. Examples thereof include nickel-cobalt composite lithium oxides ($LiNi_{0.5}Co_{0.5}O_2$, $LiNi_{0.8}Co_{0.2}O_2$, and the like). The lithium composite oxides can generate a high voltage, and thus an energy density becomes excellent.

Composite particles, in which surfaces of particles of any of the lithium-containing compounds are coated with fine particles composed of any of other lithium-containing compounds, may be employed from the viewpoints of obtaining higher electrode charge properties and cycle characteristics.

In addition, examples of other positive electrode materials capable of intercalating and deintercalating lithium include an oxide such as vanadium oxide ($V_2O_5$), titanium dioxide ($TiO_2$), and manganese dioxide ($MnO_2$), disulfides such as iron disulfide ($FeS_2$), titanium disulfide ($TiS_2$), and molybdenum disulfide ($MoS_2$), a chalcogenide such as niobium diselenide ($NbSe_2$) that does not contain lithium (particularly, a layered compound or a spinel type compound), a lithium-containing compound that contains lithium, sulfur, and a conducive polymer such as polyaniline, polythiophene, polyacetylene, and polypyrrole. The positive electrode material, which is capable of intercalating and deintercalating lithium, may be a material other than the above-described materials. In addition, two or more kinds of the above-described positive electrode materials may be mixed in an arbitrary combination.

In addition, as the conductive agent, for example, a carbon material such as carbon black and graphite can be used. As the binding agent, it is possible to use, for example, at least one kind selected from resin materials such as polyvinylidene fluoride (PVdF), polytetrafluoroethylene (PTFE), polyacrylonitrile (PAN), styrene butadiene rubber (SBR), and carboxymethyl cellulose (CMC), and copolymers containing these resin materials as a main component.

The positive electrode 53 includes the positive electrode lead 51 that is connected to one end of the positive electrode current collector 53A through spot welding or ultrasonic welding. As the positive electrode lead 51, metal foil or a member having a network shape is preferable. However, any material other than a metal may be employed as long as the material is electrochemically or chemically stable and conduction is obtained. Examples of the material of the positive electrode lead 51 include aluminum (Al), Nickel (Ni), and the like.

[Negative Electrode]

The negative electrode 54 has a structure in which a negative electrode active material layer 54B is provided on one surface or both surfaces of a negative electrode current collector 54A, and the negative electrode active material layer 54B and the positive electrode active material layer 53B are disposed to face each other.

On the other hand, although not illustrated, the negative electrode active material layer 54B may be provided on only one surface of the negative electrode current collector 54A. For example, the negative electrode current collector 54A is constituted by metal foil such as copper foil.

The negative electrode active material layer 54B contains anyone or more kinds of negative electrode materials, which are capable of intercalating and deintercalating lithium, as a negative electrode active material, and may contain other materials, for example, the same binding agent and conductive agent as in the positive electrode active material layer 53B as necessary.

In addition, in the nonaqueous electrolyte battery 62, an electrochemical equivalent of the negative electrode material capable of intercalating and deintercalating lithium is greater than that of the positive electrode 53, and is theoretically set in order for a lithium metal not to precipitate to the negative electrode 54 during charging.

In addition, in the nonaqueous electrolyte battery 62, an open circuit voltage (that is, a battery voltage) in a fully charged state is designed to be, for example, in a range of 2.80 V to 6.00 V. Particularly, in a case of using a material that forms a lithium alloy with Li/Li$^+$ or a material that intercalates lithium in the vicinity of 0 V as the negative electrode active material, the open-circuit voltage in a fully charged state is designed to be, for example, in a range of 4.20 V to 6.00 V. In this case, it is preferable that the open-circuit voltage in the fully charged state is 4.25 V to 6.00 V. In a case where the open-circuit voltage in the fully charged state is equal to or greater than 4.25 V, even in the same positive electrode active material, the amount of lithium deintercalated per unit mass further increases in comparison to a battery of 4.20 V, and thus the amount of the positive electrode active material and the amount of the negative electrode active material are adjusted in accordance with this phenomenon. According to this, a high energy density is obtained.

Examples of the negative electrode material capable of intercalating and deintercalating lithium include carbon materials such as a non-graphitization carbon, easy-graphitization carbon, graphite, pyrolytic carbons, cokes, glassy carbons, a baked body of an organic polymer compound, carbon fiber, and activated charcoal. Among these, examples of the cokes include pitch coke, needle coke, petroleum coke, and the like. The baked body of an organic polymer compound represents a carbonized material that is obtained by baking polymeric material such as a phenol resin or a furan resin at an appropriate temperature, and may be classified into non-graphitization carbon or easy-graphitization carbon in some parts. These carbon materials are preferable because a change in the crystal structure, which occurs during charging and discharging, is very small, a high charging and discharging capacity may be obtained, and a satisfactory cycle characteristic may be obtained. Particularly, graphite is preferable because an electrochemical equivalent is great and a high energy density can be obtained. In addition, non-graphitization carbon is preferable because a superior cycle characteristic may be obtained. Furthermore, a material of which charge and discharge electric potential is low, specifically, a material of which charge and discharge electric potential is close to that of a lithium metal is preferable because a high energy density of a battery can be easily realized.

Examples of other negative electrode materials which are capable of intercalating and deintercalating lithium and are capable of realizing a high capacity include a material that is capable of intercalating and deintercalating lithium and contains at least one kind of a metallic element and a metalloid element as a constituent element. The reason for this is that when using the material, it is possible to obtain a high energy density. Particularly, it is more preferable to use the material in combination with a carbon material because a high energy density and excellent cycle characteristics can be obtained. The negative electrode material may be an elementary metallic element or metalloid element, an alloy thereof, or a compound thereof, and the negative electrode material may have one or more kinds of phases thereof at least at a part. Furthermore, in the present technology, in addition to an alloy of two or more kinds of metallic elements, the term "alloy" also includes an alloy containing one or more kinds of metallic elements and one or more kinds of metalloid elements. In addition, the alloy may contain a nonmetallic element. The texture of the alloy includes a solid-solution, a eutectic crystal (a eutectic mixture), an intermetallic compound, and a texture in which two or more kinds of these textures coexist.

Examples of the metallic elements or the metalloid elements, which constitute the negative electrode material, include metallic elements or metalloid elements which are capable of forming an alloy with lithium. Specific examples of the metallic elements or the metalloid elements include magnesium (Mg), boron (B), aluminum (Al), titanium (Ti), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), platinum (Pt), and the like. These may be crystalline materials or amorphous materials.

As the negative electrode material, for example, materials containing a metallic element or a metalloid element of Group 4B in a short-period type periodic table as a constituent element are preferable, materials containing at least one of silicon (Si) and tin (Sn) as a constituent element are more preferable, and materials containing at least silicon is particularly preferable. The reason for this is that silicon (Si) and tin (Sn) have large capacity of intercalating and deintercalating lithium and can obtain a high energy density. Examples of the negative electrode material, which contains at least one kind of silicon and tin, include elementary silicon, alloys or compounds of silicon, elementary tin, alloys or compounds of tin, and materials which have one or more kinds of phases thereof at least at a part.

Examples of the alloys of silicon include alloys containing at least one kind selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a secondary constituent element other than silicon. Examples of the alloys of tin include alloys containing at least one kind selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr) as a secondary constituent element other than tin (Sn).

Examples of the compounds of tin (Sn) or silicon (Si) include compounds containing oxygen (O) or carbon (C). Furthermore, the tin or silicon compounds may contain the above-described secondary constituent element in addition to tin (Sn) or silicon (Si).

Among these, as the negative electrode material, a SnCoC-containing material, which contains cobalt (Co), tin (Sn), and carbon (C) as a constituent element and in which the amount of carbon contained is 9.9% by mass to 29.7% by mass, a ratio of cobalt (Co) to the sum of tin (Sn) and cobalt (Co) is 30% by mass to 70% by mass, is preferable. The reason for this is that a high energy density and excellent cycle characteristics can be obtained in this composition range.

This SnCoC-containing material may further contain another constituent element as necessary. As another constituent element, for example, silicon (Si), iron (Fe), nickel (Ni), chrome (Cr), indium (In), niobium (Nb), germanium (Ge), titanium (Ti), molybdenum (Mo), aluminum (Al), phosphorus (P), gallium (Ga), or bismuth (Bi) is preferable, and the SnCoC-containing material may contain two or more kinds of these constituent elements. The reason for this is that the capacity or cycle characteristic may be further improved.

Furthermore, the SnCoC-containing material has a phase including tin (Sn), cobalt (Co), and carbon (C), and it is preferable that this phase has a low crystalline or amorphous structure. In addition, in the SnCoC-containing material, it is preferable that at least a part of carbon (C) as a constituent element is bonded to a metallic element or a metalloid element as another constituent element. The reason for this is as follows. It is considered that a decrease in cycle characteristics is caused by aggregation or crystallization of tin (Sn) or the like, but when carbon (C) is bonded to another element, the aggregation or crystallization can be suppressed.

Examples of a measurement method of examining a bonding state of elements include X-ray photoelectron spectroscopy (XPS). In the XPS, in a case of graphite, a peak of the is orbital (C1s) of carbon is shown at 284.5 eV in a device that is subjected to energy calibration so that a peak of the 4f orbital (Au4f) of a gold atom is obtained at 84.0 eV. In addition, in a case of surface-contaminated carbon, the peak is shown at 284.8 eV. In contrast, in a case where the charge density of the carbon atom increases, for example, in a case where carbon is bonded to the metallic element or the metalloid element, the C1s peak is shown in a range below 284.5 eV. That is, in a case where a peak of a synthetic wave of C1s, which is obtained for the SnCoC-containing material, is shown in a range below 284.5 eV, at least a part of carbon contained in the SnCoC-containing material is bonded to the metallic element or the metalloid element as another constituent element.

Furthermore, in the XPS measurement, for example, the C1s peak is used for calibration of an energy axis of spectrum. Typically, surface-contaminated carbon is exists on a surface of the SnCoC-containing material, and thus the C1s peak of the surface-contaminated carbon is set to 284.8 eV, and this is used as an energy reference. In the XPS measurement, a waveform of the C1s peak is obtained as a waveform that includes both the peak of the surface-contaminated carbon and the peak of the carbon in the SnCoC-containing material. Accordingly, the peak of the surface-contaminated carbon and the peak of the carbon in the SnCoC-containing material are separated from each other, for example, through analysis conducted by using commercially available software. In the waveform analysis, the position of a main peak that exists on a minimum binding energy side is used as an energy reference (284.8 eV).

Examples of the negative electrode material capable of intercalating and deintercalating lithium further include a metal oxide and a polymer compound which are capable of intercalating and deintercalating lithium, and the like. Examples of the metal oxide include a lithium-titanium oxide such as lithium titanate ($Li_4Ti_5O_{12}$) that contains titanium and lithium, iron oxide, ruthenium oxide, molybdenum oxide, and the like. Examples of the polymer compound include polyacetylene, polyaniline, polypyrrole, and the like.

[Separator]

The separator 55 is a porous film that is constituted by an insulating film that has large ion permeability and predetermined mechanical strength. A nonaqueous electrolytic solution is retained in a vacancy of the separator 55.

As a resin material that constitutes the separator 55, it is preferable to use, for example, a polyolefin resin such as polypropylene and polyethylene, an acrylic resin, a styrene resin, a polyester resin, a nylon resin, and the like. Particularly, polyethylene such as low-density polyethylene, high-density polyethylene, and linear polyethylene, low-molecular-weight wax thereof, or a polyolefin resin such as polypropylene has an appropriate melting temperature and is easily available, and thus can be preferably used. In addition, it is possible to employ a structure in which two or more kinds of porous films are laminated, or a porous film that is formed by melting and kneading two or more kinds of resin materials. When including the porous film composed of the polyolefin resin, isolation between the positive electrode 53 and the negative electrode 54 becomes excellent, and it is possible to further reduce a decrease in internal short-circuit.

The thickness of the separator 55 can be set in an arbitrary manner as long as the thickness is equal to or greater than a thickness at which necessary strength can be maintained. It is preferable to set the thickness of the separator 55 to a value at which insulation between the positive electrode 53 and the negative electrode 54 is realized, short-circuit and the like are prevented, ion permeability for a preferred battery reaction through the separator 55 is provided, and it is possible to enhance volume efficiency of an active material layer, which contributes to the battery reaction in a battery, as much as possible. Specifically, it is preferable that the thickness of the separator 55 is, for example, 7 μm to 20 μm.

[Gel Electrolyte Layer]

The gel electrolyte layer 56 contains filler, a matrix polymer compound (resin), and a nonaqueous electrolytic solution (electrolytic solution). The gel electrolyte layer 56 is a layer that is constituted by a gel-like electrolyte in which the nonaqueous electrolytic solution is retained by the matrix polymer compound. When the filler is contained in the gel electrolyte layer 56, it is possible to improve the strength of the gel electrolyte layer 56. In addition, as the filler, particles, which have a shape including a plane, have a predetermined plane rate, and have a predetermined refractive index, are used so as to improve transparency of the gel electrolyte layer 56. When the gel electrolyte layer 56 is transparent, it is possible to solve a problem that it is difficult for a battery to secure stability without sacrificing a capacity thereof because the gel electrolyte layer 56 is not transparent.

Furthermore, the term "transparent" represents a state of having transparency to a certain degree capable of visually recognizing the contour of an electrode (in a case of being formed on the separator 55, the separator 55) through the gel electrolyte layer 56 that is formed on the electrode (or the separator 55). In a case where the contour of the electrode (or the separator 55) can be visually recognized in a distinct manner through the gel electrolyte layer 56, and a case where the contour of the electrode (or the separator 55) is slightly visually recognized, these cases are also included in the term "transparent". A state, in which the gel electrolyte layer 56 is translucent, a colored sate, a white turbidity state, and the like occur, and the contour of the electrode (or the separator 55) is not visually recognized in a perfect manner through the gel electrolyte layer 56, is not included in the term "transparent". Furthermore, a state, in which the contour of the electrode (or the separator 55) can be visually recognized in a more distinct manner through the gel electrolyte layer 56 (the transparency is higher), is preferable when considering that stability is more easily secured.

Hereinafter, description will be given of the filler, the nonaqueous electrolytic solution, and the resin which are contained in the gel electrolyte layer 56.

[Nonaqueous Electrolytic Solution]

The nonaqueous electrolytic solution contains an electrolyte salt, and a nonaqueous solvent that dissolves the electrolyte salt.

[Electrolyte Salt]

For example, the electrolyte salt contains one or more kinds of light metal compounds such as a lithium salt. Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr), and the like. Among these, at least one kind selected from the group consisting of lithium hexafluorophosphate, lithium tetrafluoroborate, lithium perchlorate, and lithium hexafluoroarsenate is preferable, and lithium hexafluorophosphate is more preferable.

[Nonaqueous Solvent]

Examples of the nonaqueous solvent include a lactone-based solvent such as γ-butyrolactone, γ-valerolactone, δ-valerolactone, and ε-caprolactone, a carbonic acid ester-based solvent such as ethylene carbonate, propylene carbonate, butylene carbonate, vinylene carbonate, dimethyl carbonate, ethyl methyl carbonate, and diethyl carbonate, an ether-based solvent such as 1,2-dimethoxyethane, 1-ethoxy-2-methoxy ethane, 1,2-diethoxyethane, tetrahydrofuran, and 2-methyltetrahydrofuran, a nitrile-based solvent such as acetonitrile, a sulfolane-based solvent, phosphoric acids, a phosphoric acid ester solvent, and a nonaqueous solvent such as pyrrolidones. Any one kind of the solvents may be used alone, or two or more kinds thereof may be mixed and used.

In addition, as the nonaqueous solvent, it is preferable to use a mixture of cyclic carbonic acid ester and chain carbonic acid ester, and it is more preferable that the nonaqueous solvent contains a compound in which a part or the entirety of hydrogen in the cyclic carbonic acid ester or the chain carbonic acid ester is fluorinated. As the fluorinated compound, it is preferable to use fluoroethylene carbonate (4-fluoro-1,3-dioxolan-2-one: FEC), and difluoroethylene carbonate (4,5-difluoro-1,3-dioxolane-2-one: DFEC). The reason for this is that even when using the negative electrode 54 containing a compound such as silicon (Si), tin (Sn), and germanium (Ge) as the negative electrode active material, it is possible to improve charge and discharge cycle characteristics. Among these, it is preferable to use difluoroethylene carbonate as the nonaqueous solvent. The reason for this is that difluoroethylene carbonate is excellent in an effect of improving the cycle characteristics.

[Resin]

As the resin, a matrix polymer compound which retains the electrolytic solution and has properties capable of being compatible with the solvent, and the like can be used. Examples of the resin include a fluorine-containing resin such as polyvinylidene fluoride and polytetrafluoroethylene, a fluorine-containing rubber such as a vinylidene fluoride-tetrafluoroethylene copolymer, and an ethylene-tetrafluoroethylene copolymer, rubbers such as a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, an acrylonitrile-acrylic acid ester copolymer, an ethylene propylene rubber, polyvinyl alcohol, and polyvinyl acetate, a cellulose derivative such as ethyl cellulose, methyl cellulose, hydroxyethyl cellulose, and carboxymethyl cellulose, a resin such as polyphenylene ether, polysulfone, polyether sulfone, polyphenylene sulfide, polyetherimide, polyimide, polyamide (particularly, aramide), polyamideimide, polyacrylonitrile, polyvinyl alcohol, polyether, acrylic acid resin, and polyester in which at least one of a melting point and a glass transition temperature is 180° C. or higher, polyethylene glycol, and the like.

[Filler]

As the filler that is contained in the gel electrolyte layer 56, particles, which have a shape including a plane, have a predetermined plane rate, and have a predetermined refractive index, are used from the viewpoint of reducing light scattering and improving transparency of the gel electrolyte layer 56. For example, a powder of a white inorganic material such as alumina particles is constituted by colorless transparent particles, but become white due to a light scattering phenomenon. In the present technology, it is preferable to use particles, which have a shape including a plane, have a predetermined plane rate, and have a predetermined refractive index, as the filler to suppress the light scattering that is a main cause for the whitening, and to improve transparency of the gel electrolyte layer 56.

Examples of the plane of the particles include at least one of a crystal plane that occurs through grain growth, a broken plane, and a cleavage plane, and the like. For example, the broken plane is formed through natural breakage during mixing of particles, a resin, and a dilution solvent when preparing a coating material that forms a gel electrolyte, or through intentional dividing for particle size control during preparation of the particles. For example, the cleavage plane is formed through intentional division or natural breakage in a specific atomic arrangement plane in a single crystal. For example, the particles may be a single crystal, a polycrystal, or an assembly of the single crystal and the polycrystal.

(SEM Photograph)

FIG. 3A illustrates a SEM photograph of talc particles having a shape including a plane which is observed with a scanning electronmicroscope (SEM) so as to illustrate external appearance in a typical example of the particles having a shape including a plane. FIG. 3B illustrates a SEM photograph of boehmite particles having a shape including a plane which is observed with the SEM. In the SEM photograph illustrated in FIG. 3A, a particle surface centering around a cleavage of the talc particles is observed. In the SEM photograph illustrated in FIG. 3B, a particle surface surrounded by a crystal plane that is formed through crystal growth during hydrothermal synthesis of boehmite is observed.

It is preferable that the plane rate of the particles is greater than 40% and equal to or less than 100% from the viewpoint of securing transparency of the gel electrolyte layer 56, more preferably 45% to 100% from the viewpoint of further improving the transparency, and still more preferably 60% to 100%. Furthermore, for example, the plane rate can be obtained as follows.

(Method of Measuring Plane Rate)

The gel electrolyte layer 56 is observed with the scanning electron microscope (SEM) in a direction perpendicular to a contact surface of the gel electrolyte layer 56 with an electrode, and a picture of 10 particles, which have a typical shape in a size approximately equal to a 50% average particle size (D50) on a volume basis, is taken. Furthermore, the average particle size (D50) is a value that is measured by putting a powder, which is obtained by removing a gel electrolyte component and the like from the gel electrolyte layer 56, into a laser diffraction particle size analyzer. Next, with respect to respective particles, a projection area of a plane (in a case where a plurality of the planes exist, a total area thereof) equivalent to the crystal plane, the broken plane, or the cleavage plane in a projection area is obtained to calculate the percentage of the projection area of the plane with respect to a projection area of all of the particles, and then an average value of the calculated percentages of the respective particles is set as the plane rate.

(Method of Producing Particle Having Shape Including Plane)

Examples of producing the particles having a shape including a plane include a growth method of growing a single crystal to form a flat crystal plane, a method of dividing crystal particles through pulverization, and the like. As the method of growing the single crystal, a flux method in which growing occurs in a liquid, a hydrothermal growth method, a coprecipitation method, and the like are preferable.

In the case of pulverization, a method of using a material having Mohs hardness of 5 or less, a method of cleaving a specific lattice plane, and the like can be exemplified. In this case, in a process of dispersing a material in a solution (a coating material that is used to form the gel electrolyte layer) for an electrolyte, dispersion of the material and pulverization of the material can be simultaneously performed by using a dispersion type such as a despa mill and a bead mill.

(Refractive Index of Particles)

The refractive index of particles is equal to or greater than 1.3 and less than 2.4 from the viewpoint of suppressing light scattering and securing transparency of the gel electrolyte layer 56, and preferably 1.3 to 2.1. The reason for this is that a decrease in transparency due to scattering through optical refraction, which is caused by a difference (a difference between a high refractive index of a solid and a low refractive index of a liquid) in a refractive index between the gel electrolyte and the filler (particles), is suppressed. Among solid particles, particles, in which a refractive index on a low refractive index side is in a range of equal to or greater than 1.3 and less than 2.4, and preferably in a range of 1.3 to 2.1, are used so as to make a refractive index of the solid particles be close to that of the gel electrolyte of which a refractive index decreases since a liquid electrolytic solution is contained.

As the particles, for example, at least one kind of inorganic particles and organic particles, and the like can be used. Examples of the inorganic particles which can be used include particles of a metal oxide, a sulfate compound, a carbonate compound, a metal hydroxide, a metal carbide, a metal nitride, a metal fluoride, a phosphate compound, a mineral, and the like. Furthermore, typically, particles having electrical insulating properties are used, but particles (fine particles), which are obtained by subjecting surfaces of the particles (fine particles) of a conductive material to a surface treatment and the like with an electrically insulating material to have the electrical insulating properties, may be used.

Examples of the metal oxide, which can be preferably used, include silicon oxide ($SiO_2$), silica (silica powder, quartz glass, glass bead, diatomite, wet or dry synthesized product, and the like; examples of the wet synthesized product include colloidal silica, and examples of the dry synthesized product include fumed silica), zinc oxide (ZnO), tin oxide (SnO), magnesium oxide (magnesia, MgO), antimony oxide ($Sb_2O_3$), aluminum oxide (alumina, $Al_2O_3$), and the like.

Examples of the sulfate compound, which can be preferably used, include magnesium sulfate ($MgSO_4$), calcium sulfate ($CaSO_4$), barium sulfate ($BaSO_4$), strontium sulfate ($SrSO_4$), and the like. Examples of the carbonate compound, which can be preferably used, include magnesium carbonate ($MgCO_3$, magnesite), calcium carbonate ($CaCO_3$, calcite), barium carbonate ($BaCO_3$), lithium carbonate ($Li_2CO_3$), and the like. Examples of the metal hydroxide, which can be preferably used, include oxyhydroxide or hydrous oxide such as magnesium hydroxide ($Mg(OH)_2$, brucite), aluminum hydroxide ($Al(OH)_3$ (bayerite, gibbsite)), zinc hydroxide ($Zn(OH)_2$), boehmite ($Al_2O_3H_2O$ or AlOOH, diaspore), white carbon ($SiO_2.nH_2O$, silica hydrate), zirconium oxide hydrate ($ZrO_2.nH_2O$ (n=0.5 to 10)), and magnesium oxide hydrate ($MgO_a.mH_2O$ (a=0.8 to 1.2, and m=0.5 to 10)), a hydroxide hydrate such as magnesium hydroxide octahydrate, and the like. Examples of the metal carbide, which can be preferably used, include boron carbide ($B_4C$), and the like. Examples of the metal nitride, which can be preferably used, include silicon nitride ($Si_3N_4$), boron nitride (BN), aluminum nitride (AlN), titanium nitride (TiN), and the like.

Examples of the metal fluoride, which can be preferably used, include lithium fluoride (LiF), aluminum fluoride ($AlF_3$), calcium fluoride ($CaF_2$), barium fluoride ($BaF_2$), magnesium fluoride, and the like. Examples of the phosphate compound, which can be preferably used, include trilithium phosphate ($Li_3PO_4$), magnesium phosphate, magnesium hydrogenphosphate, ammonium polyphosphate, and the like.

Examples of the mineral include a silicate mineral, a carbonate mineral, an oxide mineral, and the like. The silicate mineral is classified into a nesosilicate mineral, a sorosilicate mineral, a cyclosilicate mineral, an inosilicate mineral, a layered (philo) silicate mineral, and a tectosilicate mineral on the basis of a crystal structure. Furthermore, there is a mineral that is classified as a fibrous silicate mineral called asbestos on the basis of a classification standard different from the crystal structure.

The nesosilicate mineral is an island-shaped tetrahedral silicate mineral constituted by independent Si—O tetrahedron ($[SiO_4]^{4-}$). Examples of the nesosilicate mineral include minerals equivalent to olivines, minerals equivalent to garnets, and the like. More specific examples of the nesosilicate mineral include olivine (continuous solid-solution of $Mg_2SiO_4$ (forsterite) and $Fe_2SiO_4$ (fayalite)), magnesium silicate (forsterite, $Mg_2SiO_4$), aluminum silicate ($Al_2SiO_5$, sillimanite, andalusite, kyanite), zinc silicate (willemite, $Zn_2SiO_4$), zirconium silicate (zircon, $ZrSiO_4$), mullite ($3Al_2O_3.2SiO_2-2Al_2O_3.SiO_2$), and the like.

The sorosilicate mineral is a group structure type silicate mineral that is constituted by a multiple bond group ($[Si_2O_7]^{6-}$ and $[Si_5O_{16}]^{12-}$) of the Si—O tetrahedron. Examples of the sorosilicate mineral include minerals equivalent to vesuvianite and epidote, and the like.

The cyclosilicate mineral is an annular body type silicate mineral that is constituted by a finite (three to six)-bond annular body ($[Si_3O_9]^{6-}$, $[Si_4O_{12}]^{8-}$, and $[Si_6O_{18}]^{12-}$) of the Si—O tetrahedron. Examples of the cyclosilicate mineral include beryl, tourmalines, and the like.

The inosilicate mineral is a fibrous silicate mineral in which connection of the Si—O tetrahedron indefinitely extends, and makes up a chain shape ($[Si_2O_6]^{4-}$), and a strip shape ($[Si_3O_9]^{6-}$, $[Si_4O_{11}]^{6-}$, $[Si_5O_{15}]^{10-}$, and $[Si_7O_{21}]^{14-}$) Examples of the inosilicate mineral include minerals equivalent to pyroxenes such as calcium silicate (wollastonite, $CaSiO_3$), minerals equivalent to amphiboles, and the like.

The layered silicate mineral is a layered silicate mineral that makes up a mesh bond of the Si—O tetrahedron ($[SiO_4]^{4-}$). Furthermore, specific examples of the layered silicate mineral will be described later.

The tectosilicate mineral is a three-dimensional network structure type silicate mineral in which the Si—O tetrahedron ($[SiO_4]^{4-}$) makes up a three-dimensional network bond. Examples of the tectosilicate mineral include quartz, feldspars, zeolites, aluminosilicate ($aM_2O.bAl_2O_3.cSiO_2.dH_2O$, M represents a metallic element, and a, b, c, and d are integers of 1 or greater, respectively) of zeolite ($M_{2/n}O.Al_2O_3.xSiO_2.yH_2O$, M represents a metallic element, n represents a valence of M, x≥2, and y≥0) and the like, and the like.

Examples of the asbestos include chrysotile, amosite, anthophyllite, and the like.

Examples of the carbonate mineral include dolomite ($CaMg(CO_3)_2$), hydrotalcite ($Mg_6Al_2$ $(CO_3)$ $(OH)_{16}.4$ $(H_2O)$), and the like.

Examples of the oxide mineral include spinel ($MgAl_2O_4$), and the like.

As other minerals, barium titanate ($BaTiO_3$), strontium titanate ($SrTiO_3$), and the like can be exemplified. Furthermore, the minerals may be natural minerals or artificial minerals.

Furthermore, some of the minerals are classified as clay minerals. Examples of the clay minerals include a crystalline clay mineral, a non-crystalline or quasi-crystalline clay mineral, and the like. Examples of the crystalline clay minerals include a layered silicate mineral, a mineral having a structure close to that of layered silicate, other silicate minerals, a layered carbonate mineral, and the like.

The layered silicate mineral includes a tetrahedral sheet of Si—O, and an octahedral sheet of Al—O, Mg—O, and the like which are associated with the tetrahedral sheet. Typically, a layered silicate is classified in accordance with the number of the tetrahedral sheets and the octahedral sheets, the number of positive ions of an octahedron, and a layer charge. Furthermore, the layered silicate mineral may be a mineral in which the entirety or a part of interlayer metal ions is substituted with an organic ammonium ion and the like, and the like.

Specific examples of the layered silicate mineral include minerals equivalent to a kaolinite-serpentine group having 1:1 type structure, a pyrophyllite-talc group having 2:1 type structure, a smectite group, a vermiculite group, a mica group, a brittle mica group, a chlorite group, and the like, and the like.

Examples of the mineral equivalent to the kaolinite-serpentine group include chrysotile, antigorite, lizardite, kaolinite ($Al_2Si_2O_5(OH)_4$), dickite, and the like. Examples of the mineral equivalent to the pyrophyllite-talc group include talc ($Mg_3Si_4O_{10}(OH)_2$), willemseite, pyrophyllite ($Al_2Si_4O_{10}(OH)_2$), and the like. Examples of the mineral equivalent to the smectite group include saponite [$(Ca/2, Na)_{0.33}(Mg, Fe^{2+})_3(Si,Al)_4O_{10}(OH)_2.4H_2O$], hectorite, sauconite, montmorillonite {$(Na, Ca)_{0.33}(Al, Mg)2Si_4O_{10}(OH)_2.nH_2O$; examples of clay that contains montmorillonite as a main component is referred to as bentonite}, beidellite, nontronite, and the like. Examples of the mineral equivalent to the mica group include muscovite ($KAl_2(AlSi_3)O_{10}(OH)_2$), sericite, phlogopite, biotite, lepidolite, and the like. Examples of the mineral equivalent to the brittle mica group include margarite, clintonite, anandite, and the like. Examples of the mineral equivalent to chlorite group include cookeite, sudoite, clinochlore, chamosite, nimite, and the like.

Examples of the mineral having a structure close to that of layered silicate include moisture-containing magnesium silicate which has a 2:1 ribbon structure in which tetrahedral sheets arranged in a ribbon shape are connected to an adjacent tetrahedral sheet arranged in a ribbon shape during reverse rotation around the apex, and the like. Examples of the moisture-containing magnesium silicate include sepiolite ($Mg_9Si_{12}O_{30}(OH)_6(OH_2)_4 \cdot 6H_2O$), palygorskite, and the like.

Examples of other silicate minerals include porous aluminosilicate such as zeolite ($M_{2/n}O \cdot Al_2O_3 \cdot xSiO_2 \cdot yH_2O$, M represents a metallic element, n represents a valence of M, $x \geq 2$, $y \geq 0$), attapulgite [$(Mg, Al)2Si_4O_{10}(OH) \cdot 6H_2O$], and the like.

Examples of the layered carbonate mineral include hydrotalcite ($Mg_6Al_2 (CO_3) (OH)_{16}^{0.4}(H_2O)$), and the like.

Examples of the non-crystalline or quasi-crystalline clay mineral include hisingerite, imogolite ($Al_2SiO_3(OH)$), allophane, and the like.

These inorganic particles may be used alone, or two more kinds thereof may be mixed and used. The inorganic particles have oxidation resistance. Accordingly, in a case where the gel electrolyte layer 56 is provided between the positive electrode 53 and the separator 55, in the vicinity of the positive electrode during charging, strong resistance against an oxidizing environment is also provided.

The particles may be organic particles. Examples of a material that constitutes the organic particles include melamine, melamine cyanurate, melamine polyphosphate, crosslinked polymethyl methacrylate (crosslinked PMMA), polyethylene, polypropylene, polystyrene, polytetrafluoroethylene, polyvinylidene fluoride, polyamide, polyimide, a melamine resin, a phenol resin, an epoxy resin, and the like. These materials may be used alone, or two or more kinds thereof may be mixed and used.

(Mixing Ratio between Particles and Resin) It is preferable that a mixing ratio between particles and a resin is in a range of 15/85 to 90/10 in a mass ratio (particle/resin) from the viewpoint of making the refractive index of the gel electrolyte be close to that of the filler particles to further improve transparency, more preferably in a range of 20/80 to 90/10, and still more preferably in a range of 20/80 to 80/20.

(Mixing Ratio Between Particles and Electrolyte Salt)

It is preferable that a mixing ratio between the particles and the electrolyte salt is in a range of 15/85 to 90/10 in a mass ratio (particle/electrolyte salt) from the viewpoint of making the refractive index of the gel electrolyte be close to that of the filler particles to further improve transparency, more preferably in a range of 20/80 to 90/10, and still more preferably in a range of 20/80 to 80/20.

(Amount of Particles Contained)

It is preferable that the amount of particles contained is 5.2% by mass to 50.0% by mass on the basis of the mass of the electrolyte from the viewpoint of making the refractive index of the gel electrolyte be close to that of the filler particles to further improve transparency, and more preferably 5.2% by mass to 30.8% by mass.

(Amount of Resin Contained)

It is preferable that the amount of resin contained is 5.6% by mass to 30.8% by mass on the basis of the mass of the electrolyte from the viewpoint of making the refractive index of the gel electrolyte be close to that of the filler particles to further improve transparency, and more preferably 7.7% by mass to 30.8% by mass. On the other hand, when the amount of the resin contained is greater than 30.8% by mass, ion migration resistance in the battery increases, and an output tends to decrease.

(Amount of Electrolyte Salt Contained)

It is preferable that the amount of the electrolyte salt contained is 5.6% by mass to 30.8% by mass on the basis of the mass of the electrolyte from the viewpoint of making the refractive index of the gel electrolyte be close to that of the filler particles to further improve transparency, and more preferably 7.7% by mass to 30.8% by mass. On the other hand, when the amount of the electrolyte salt contained is greater than 30.8% by mass, ion migration resistance in the battery increases, and an output tends to decrease.

[Method of Manufacturing Nonaqueous Electrolyte Battery]

For example, the nonaqueous electrolyte battery 62 can be manufactured as follows.

[Method of Manufacturing Positive Electrode]

A positive electrode active material, a conductive agent, and a binding agent are mixed to prepare a positive electrode mixture, and the positive electrode mixture is dispersed in a solvent such as N-methyl-2-pyrrolidone to prepare paste-like positive electrode mixture slurry. Next, the positive electrode mixture slurry is applied to the positive electrode current collector 53A, and the solvent is dried. Then, compression molding is performed by using a roll press machine and the like to form the positive electrode active material layer 53B, thereby preparing the positive electrode 53.

[Method of Manufacturing Negative Electrode]

A negative electrode active material and a binding agent are mixed to prepare a negative electrode mixture, and the negative electrode mixture is dispersed in a solvent such as N-methyl-2-pyrrolidone to prepare paste-like negative electrode mixture slurry. Next, the negative electrode mixture slurry is applied to the negative electrode current collector 54A, and the solvent is dried. Then, compression molding is performed by using a roll press machine to form the negative electrode active material layer 54B, thereby preparing the negative electrode 54.

[Preparation of Nonaqueous Electrolytic Solution]

The nonaqueous electrolytic solution is prepared by dissolving an electrolyte salt in a nonaqueous solvent.

[Assembly of Nonaqueous Electrolyte Battery]

A precursor solution (coating material) that contains a nonaqueous electrolytic solution, a resin, filler, and a dilution solvent (dimethyl carbonate and the like) is applied to both surfaces of at least one of the positive electrode 53 and the negative electrode 54, and then the dilution solvent is volatilized to form the gel electrolyte layer 56. Then, the positive electrode lead 51 is attached to an end of the positive electrode current collector 53A through welding. In addition, the negative electrode lead 52 is attached to an end of the negative electrode current collector 54A through welding.

Next, the positive electrode 53 on which the gel electrolyte layer 56 is formed, and the negative electrode 54 on which the gel electrolyte layer 56 is formed are laminated through the separator 55 to obtain a laminated body. Then, the laminated body is wound along the longitudinal direction thereof, and the protective tape 57 is bonded to the outermost peripheral portion, thereby forming the wound electrode body 50.

On the other hand, the wound electrode body 50 can be formed as follows. The precursor solution is applied to at least one surface of both surfaces of the separator 55, and the dilution solvent is volatilized. According to this, the gel electrolyte layer 56 is formed on both surfaces of the separator 55. Furthermore, the positive electrode lead 51 is attached to the end of the positive electrode current collector 53A in advance through welding, and the negative electrode lead 52 is attached to the end of the negative electrode current collector 54A in advance through welding. The positive electrode 53 and the negative electrode 54 are laminated through the separator 55 in which the gel electrolyte layer 56 is formed on both surfaces thereof to obtain a laminated body. Then the laminated body is wound along the longitudinal direction thereof to obtain the wound electrode body 50.

Furthermore, the gel electrolyte layer 56 is required to be transparent so that accuracy of a clearance between the edge of the positive electrode 53, the edge of the negative electrode 54, and the edge of the separator 55 with respect to an appropriate clearance is maintained to a high degree during formation of the wound electrode body 50 by accurately grasping ends of the electrodes and the like by using a photographing unit such as a camera.

For example, the lamination and the winding of the positive electrode 53, the negative electrode 54, and the separator 55 during formation of the wound electrode body 50 is typically formed by laminating and winding the positive electrode 53, the negative electrode 54, and the separator 55 by using, for example, a winding device (winder). At this time, the camera is installed in the winding device, a state during winding is photographed (for example, for each rotation, and the like), and photographed image data is transmitted to an image processing device. The image processing device detects position data of the edges of the respective electrodes and/or the separator through image processing, and detects whether or not a winding deviation occurs between the positive electrode 53, the negative electrode 54, and the separator 55 on the basis of, for example, a difference of the position data between the edges of the respective members. In a case where it is determined that the winding deviation occurs, this determination result is fed back to a winding unit of the winding device, and the winding unit of the winding device is controlled so that the edge positions of the positive electrode 53, the negative electrode 54, and the separator 55 match correct edge positions, respectively.

In this case, photographing of an end of an application target, which is performed by the photographing unit such as the camera, is performed through the gel electrolyte layer 56 that is formed on the application target (the positive electrode 53, the negative electrode 54, or the separator 55). Accordingly, in a case where the gel electrolyte layer 56 is not transparent, the detection of the edge position of the application target is not performed in a satisfactory manner, and thus the winding deviation occurs. For example, in a case where the detection of the edge position is performed with respect to only one reference side on one side, and the winding deviation occurs due to erroneous detection, there is a concern that the edges of the positive and negative electrodes which are opposite to the one reference side may protrude from the separator, and thus short-circuit may occur. In contrast, in the present technology, since the gel electrolyte layer 56 that is formed on the application target is transparent, it is possible to solve the problem that the detection of the edge position of the application target is not performed in a satisfactory manner, and it is possible to suppress occurrence of the winding deviation. Accordingly, it is possible to avoid a short-circuit failure due to the winding deviation in the battery, and it is possible to secure stability.

Finally, for example, the wound electrode body 50 is inserted between parts of the exterior packaging member 60, and outer edge portions of the exterior packaging member 60 are brought into close contact with each other through thermal fusion, and the like, thereby sealing the exterior packaging member 60. At this time, the adhesion film 61 is inserted between the positive electrode lead 51, the negative electrode lead 52, and the exterior packaging member 60. According to this, the nonaqueous electrolyte battery 62 illustrated in FIGS. 1 and 2 is completed.

(1-2) Second Example

Figure 4:
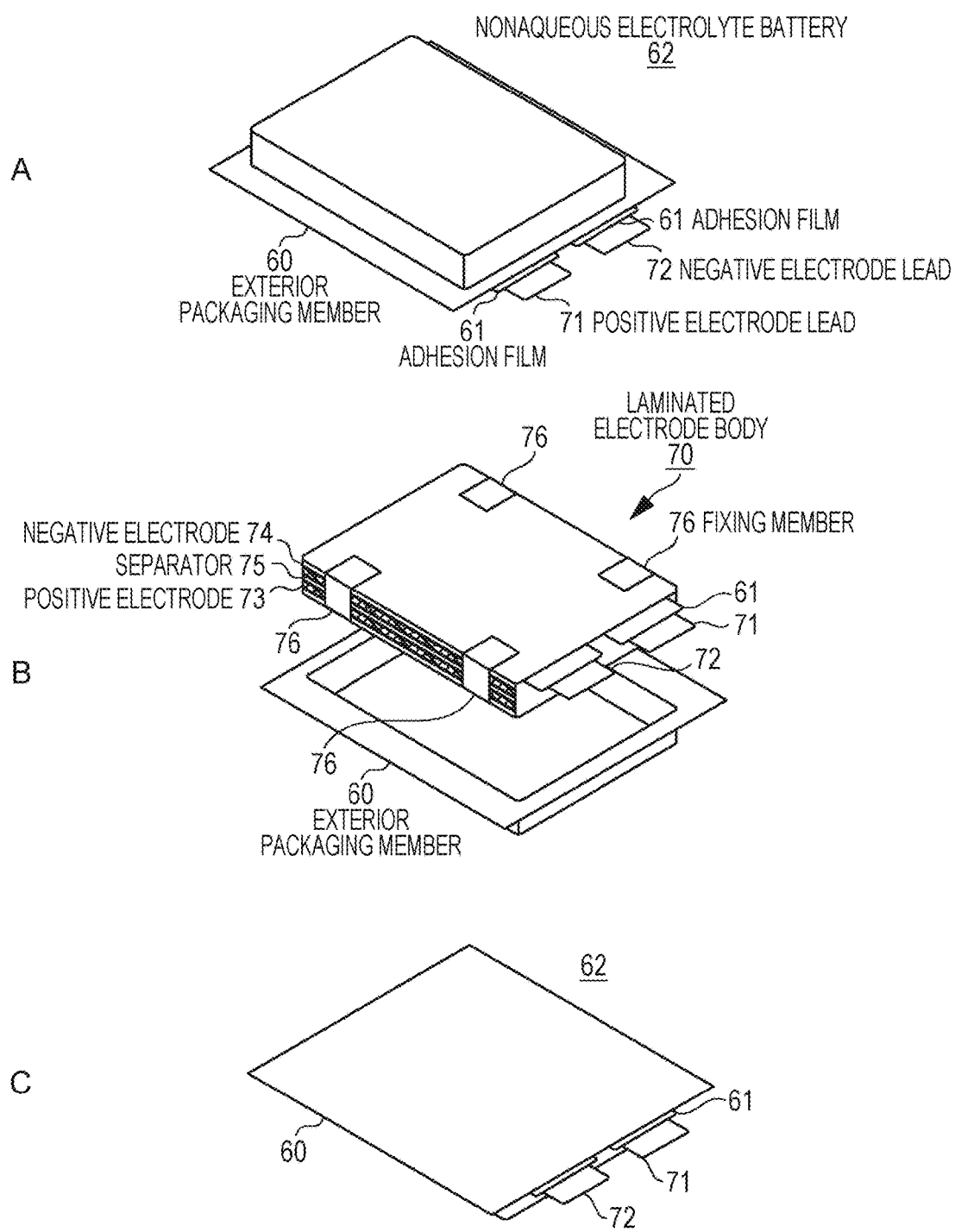
FIGS. 4A to 4C are exploded perspective views illustrating a configuration of a laminated film type nonaqueous electrolyte battery that uses the laminated electrode body.

In the above-described first example, description has been given of the nonaqueous electrolyte battery 62 in which the wound electrode body 50 is packaged with the exterior packaging member 60, but as illustrated in FIGS. 4A to 4C, a laminated electrode body 70 may be used instead of the wound electrode body 50. FIG. 4A is an external appearance view of the nonaqueous electrolyte battery 62 in which the laminated electrode body 70 is accommodated. FIG. 4B is an exploded perspective view illustrating a state in which the laminated electrode body 70 is accommodated in the exterior packaging member 60. FIG. 4C is an external appearance view illustrating the external appearance of the nonaqueous electrolyte battery 62, which is illustrated in FIG. 4A, on a bottom side.

As the laminated electrode body 70, a laminated electrode body 70, in which a rectangular positive electrode 73 and a rectangular negative electrode 74 are laminated through a rectangular separator 75, and are fixed by a fixing member 76, is used. Furthermore, although not illustrated in the drawings, a gel electrolyte layer is provided to come into contact with the positive electrode 73 and the negative electrode 74. For example, the gel electrolyte layer (not illustrated) is provided between the positive electrode 73 and the separator 75, and between the negative electrode 74 and the separator 75. The gel electrolyte layer is the same as the gel electrolyte layer 56 in the first example. A positive electrode lead 71 that is connected to the positive electrode 73, and a negative electrode lead 72 that is connected to the negative electrode 74 are led out from the laminated electrode body 70, and the adhesion film 61 is provided between the positive electrode lead 71 and the exterior packaging member 60, and between the negative electrode lead 72 and the exterior packaging member 60, respectively.

In addition, although not illustrated in the drawings, as is the case with the first example, the positive electrode 73, the negative electrode 74, and the separator 75 are laminated through the gel electrolyte layer (not illustrated) that is provided therebetween in such a manner that a predetermined clearance is formed between the edge of four sides of the rectangular positive electrode 73, the edge of the four sides of the rectangular negative electrode 74, and the edge of four sides of the rectangular separator 75. The gel electrolyte layer covers at least a part of a peripheral end surface of the positive electrode 73, and at least a part of a peripheral end surface of the negative electrode 74.

Furthermore, a method of forming the gel electrolyte layer and a method of thermally fusing the exterior packaging member 60 are the same as in the first example. In addition, as is the case with the first example, in a case where the gel electrolyte layer 56 is not transparent during formation of the laminated electrode body 70, detection of an edge position is not performed in a satisfactory manner, and thus a lamination deviation occurs. For example, in a case where the detection of the edge position is performed with respect to only two adjacent reference sides, and the lamination deviation occurs due to erroneous detection, there is a concern that edges of the positive and negative electrodes which are opposite to the two adjacent reference sides may protrude from the separator, and short-circuit may occur. In contrast, in the present technology, since the gel electrolyte layer, which is formed on an application target (the electrodes or the separator 75), is transparent, it is possible to solve the problem that the edge detection of the application target (the electrodes or the separator 75) is not performed in a satisfactory manner. Accordingly, it is possible to suppress occurrence of a deviation (lamination deviation) in a clearance between edges of the positive electrode 73, the negative electrode 74, and the separator 75. According to this, it is possible to avoid a short-circuit failure in the battery, and it is possible to secure stability.

2. Second Embodiment

In a second embodiment, description will be given of an example of a battery pack of a laminated film type battery (nonaqueous electrolyte battery) provided with the same gel electrolyte layer as in the first embodiment.

The battery pack is a simple type battery pack (also, referred to as a soft pack). The simple type battery pack is embedded in an electronic apparatus. In the simple type battery pack, a battery cell, a protective circuit, and the like are fixed with an insulating tape, a part of the battery cell is exposed, and an output such as a connector that is connected to an electronic apparatus main body is provided.

Figure 5:
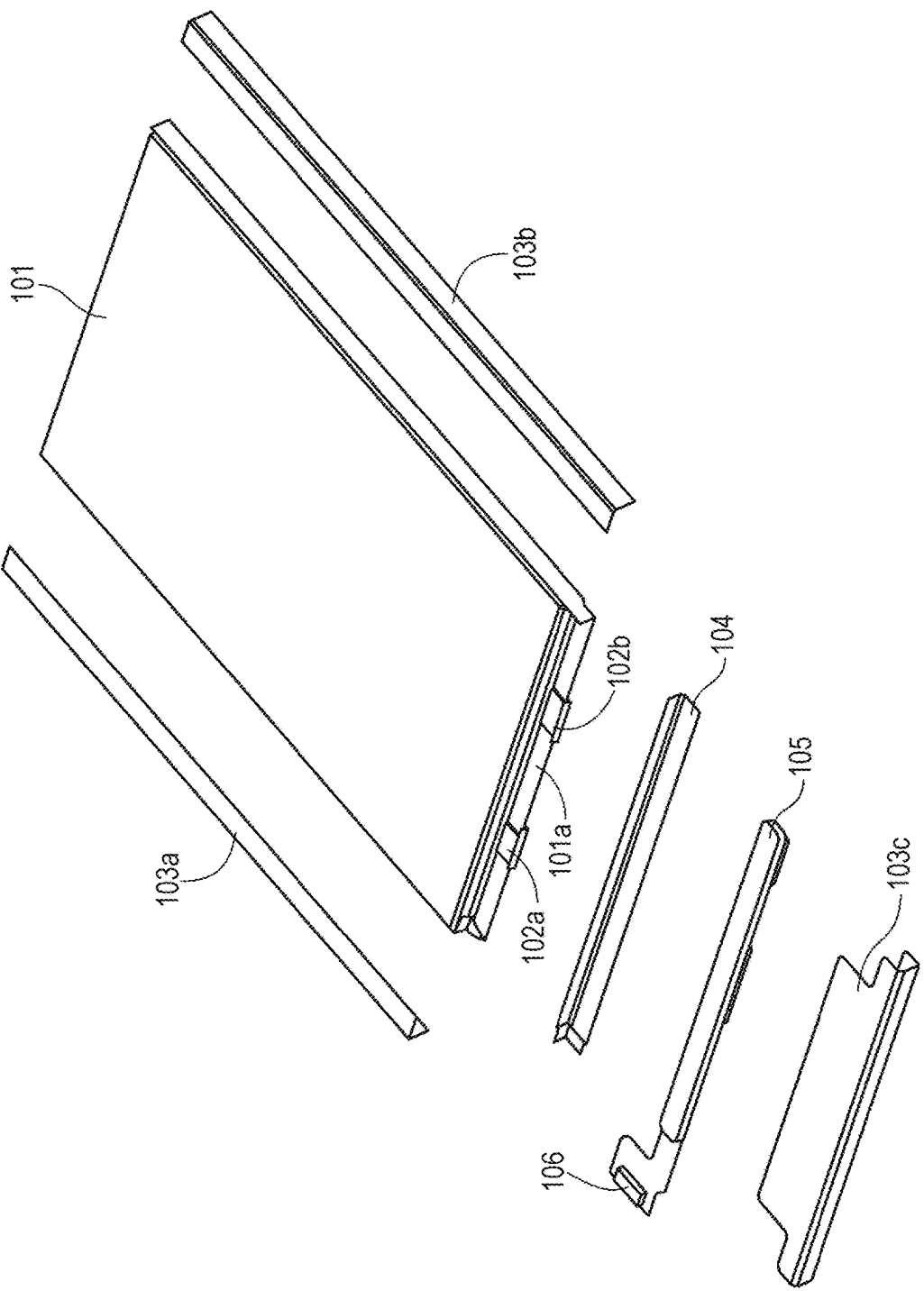
FIG. 5 is an exploded perspective view illustrating a configuration example of a simple type battery pack.

An example of a configuration of the simple type battery pack will be described. FIG. 5 is an exploded perspective view illustrating a configuration example of the simple type battery pack. FIG. 6A is a schematic perspective view illustrating the external appearance of the simple type battery pack, and FIG. 6B is a schematic perspective view illustrating the external appearance of the simple type battery pack.

As illustrated in FIG. 5, and FIGS. 6A and 6B, the simple type battery pack includes a battery cell 101, leads 102a and 102b which are led out from the battery cell 101, insulating tapes 103a to 103c, an insulating plate 104, a circuit substrate 105 on which a protective circuit (PCM; Protection Circuit Module) is provided, and a connector 106. For example, the battery cell 101 is the same as the nonaqueous electrolyte secondary battery as in the first embodiment.

The insulating plate 104 and the circuit substrate 105 are disposed at a terrace portion 101a on a front end side of the battery cell 101, and the leads 102a and 102b, which are led out from the battery cell 101, are connected to the circuit substrate 105.

The connector 106 for output is connected to the circuit substrate 105. The members such as the battery cell 101, the insulating plate 104, and the circuit substrate 105 are fixed by pasting the insulating tapes 103a to 103c to predetermined positions.

3. Third Embodiment

Figure 7:
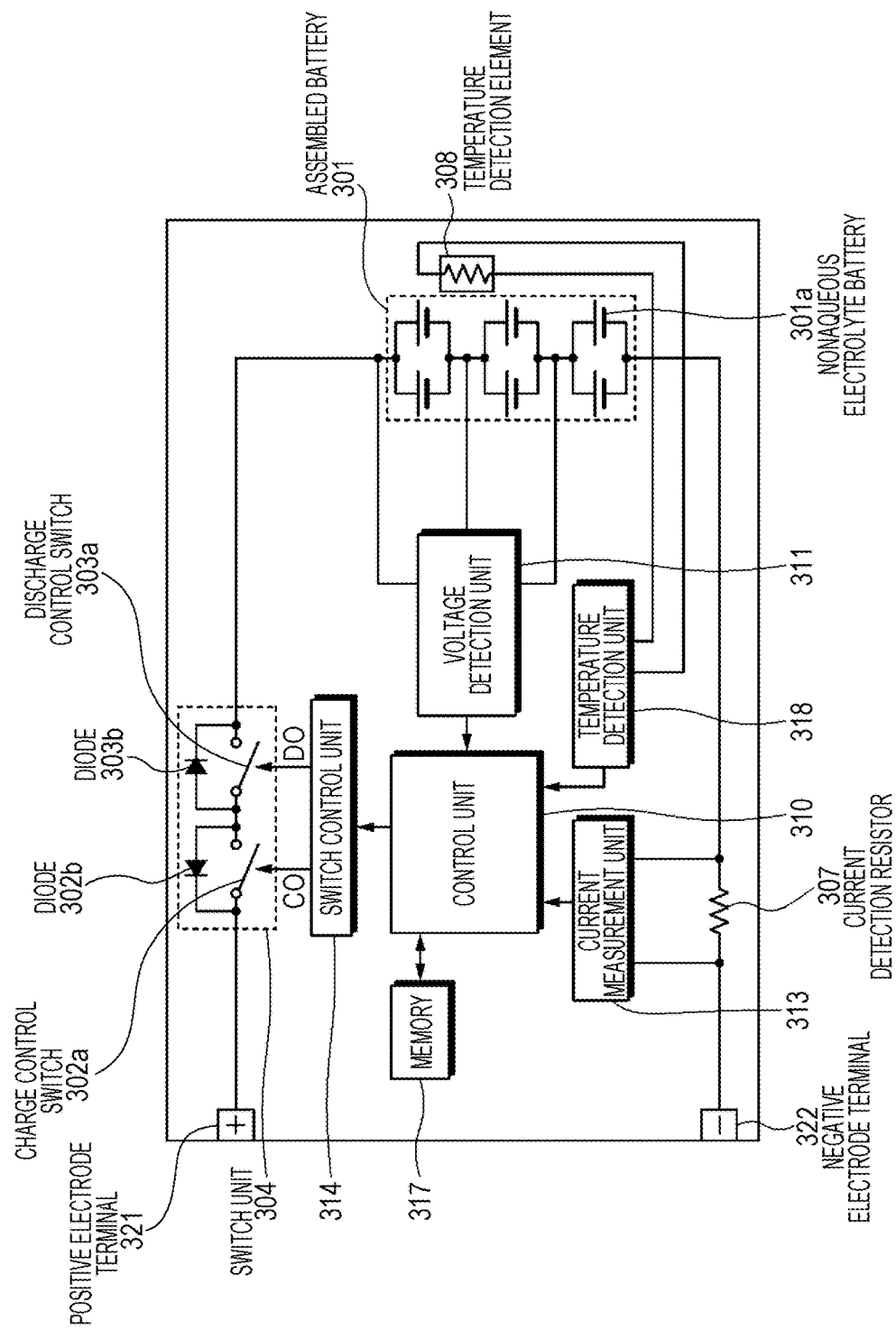
FIG. 7 is a block diagram illustrating a circuit configuration example of a battery pack according to an embodiment of the present technology.

FIG. 7 is a block diagram illustrating a circuit configuration example in a case where the battery (hereinafter, referred to as appropriately secondary battery) according to the first embodiment of the present technology is applied to a battery pack. The battery pack includes an assembled battery 301, an exterior package, a switch unit 304 provided with a charge control switch 302a and a discharge control switch 303a, a current detection resistor 307, a temperature detection element 308, and a control unit 310.

In addition, the battery pack is provided with a positive electrode terminal 321 and a negative electrode lead 322, and the positive electrode terminal 321 and the negative electrode lead 322 are connected to a positive electrode terminal and a negative electrode terminal of a charger, respectively, during charging to carry out the charging. In addition, at the time of using an electronic apparatus, the positive electrode terminal 321 and the negative electrode lead 322 are connected to a positive electrode terminal and a negative electrode terminal of the electronic apparatus to carry out discharging.

The assembled battery 301 is obtained by connecting a plurality of secondary batteries 301a in series and/or in parallel. The secondary batteries 301a are secondary batteries of the present technology. In addition, in FIG. 7, a case where six secondary batteries 301a are connected in two-parallel and three-series (2P3S) is illustrated as an example, but in addition to this, an arbitrary connection method such as n-parallel m-series (n and mare integers) is possible.

The switch unit 304 is provided with the charge control switch 302a and a diode 302b, and the discharge control switch 303a and a diode 303b, and is controlled by the control unit 310. The diode 302b has a reverse directional polarity with respect to a charge current that flows in a direction from the positive electrode terminal 321 to the assembled battery 301, and a forward directional polarity with respect to a discharge current that flows in a direction from the negative electrode lead 322 to the assembled battery 301. The diode 303b has a forward directional polarity with respect to the charge current and a reverse directional polarity with respect to the discharge current. Furthermore, in this example, the switch unit 304 is provided at a positive side, but may be provided at a negative side.

The charge control switch 302a is controlled by a charge and discharge control unit in such a manner that when a battery voltage becomes an overcharge detection voltage, the charge control switch 302a is turned off, and thus a charge current does not flow through a current path of the assembled battery 301. After the charge control switch 302a is turned off, only discharging through the diode 302b is possible. In addition, the charge control switch 302a is controlled by the control unit 310 in such a manner that when a large current flows during charging, the charge control switch 302a is turned off so as to block a charge current flowing through the current path of the assembled battery 301.

The discharge control switch 303a is controlled by the control unit 310 in such a manner that when the battery voltage becomes an overdischarge detection voltage, the discharge control switch 303a is turned off, and thus a discharge current does not flow through the current path of the assembled battery 301. After the discharge control switch 303a is turned off, only charging through the diode 303b is possible. In addition, the discharge control switch 303a is controlled by the control unit 310 in such a manner that when a large current flows during discharging, the discharge control switch 303a is turned off so as to block a discharge current flowing through the current path of the assembled battery 301.

For example, the temperature detection element 308 is a thermistor, and is provided in the vicinity of the assembled battery 301 to measure a temperature of the assembled battery 301 and to supply the temperature that is measured to the control unit 310. A voltage detection unit 311 measures the voltage of the assembled battery 301 and the respective secondary batteries 301a which constitute the assembled battery 301, A/D converts the voltage that is measured, and supplies the voltage that is converted to the control unit 310. A current measurement unit 313 measures a current by using the current detection resistor 307, and supplies the current that is measured to the control unit 310.

A switch control unit 314 controls the charge control switch 302a and the discharge control switch 303a of the switch unit 304 on the basis of the voltage and current which are input from the voltage detection unit 311 and the current measurement unit 313. When the voltage of any one of the secondary batteries 301a becomes equal to or less than the overcharge detection voltage or the overdischarge detection voltage, or when the large current suddenly flows, the switch control unit 314 transmits a control signal to the switch unit 304 so as to prevent overcharging, overdischarging, and overcurrent charging and discharging.

Here, for example, in a case where the secondary battery is a lithium ion secondary battery, the overcharge detection voltage is defined to, for example, 4.20 V±0.05 V, and the overdischarge detection voltage is defined to, for example, 2.4 V±0.1 V.

As charge and discharge switches, for example, a semi-conductor switch such as a MOSFET may be used. In this case, parasitic diodes of the MOSFET function as the diodes 302b and 303b. In a case where P-channel type FETs are used as the charge and discharge switches, the switch control unit 314 supplies control signals DO and CO with respect to respective gates of the charge control switch 302a and the discharge control switch 303a, respectively. In a case where charge control switch 302a and the discharge control switch 303a are P-channel type switches, the switches are turned on with respect to a gate potential lower than a source potential by a predetermined value or greater. That is, in normal charging and discharging operations, the control signal CO and DO are set to a low level, and the charge control switch 302a and the discharge control switch 303a are turned on.

In addition, for example, during overcharge or overdischarge, the control signals CO and DO are set to a high level, and the charge control switch 302a and the discharge control switch 303a are turned off.

A memory 317 is constituted by a RAM or a ROM, for example, an erasable programmable read only memory (EPROM) that is a nonvolatile memory or the like. In the memory 317, a value calculated by the control unit 310, an internal resistance value, which is measured at a manufacturing process stage, of the battery at an initial state of the respective secondary batteries 301a, and the like are stored in advance, and these values may be appropriately rewritten. In addition, a full charge capacity of the secondary batteries 301a may be stored in the memory 317, and for example, a remaining capacity may be calculated in combination with the control unit 310.

In a temperature detection unit 318, the temperature is measured by using the temperature detection element 308, and at the time of abnormal heat generation, charge and discharge control is performed, or correction is performed during calculation of the remaining capacity.

4. Fourth Embodiment

The battery according to the first embodiment of the present technology, and the battery packs according to the second embodiment and the third embodiment with the battery may be mounded on apparatuses such as an electronic apparatus, an electrically driven vehicle, and an electrical storage device, or may be used to supply electric power to the apparatuses.

Examples of the electronic apparatus include a notebook computer, a portable information terminal (PDA), a cellular phone, a cordless phone handset, a video movie, a digital still camera, an electronic book, an electronic dictionary, a music player, a radio, a headphone, a gaming machine, a navigation system, a memory card, a pacemaker, a hearing aid, an electric tool, an electric shaver, a refrigerator, an air-conditioner, a television, a stereo, a water heater, a microwave oven, a dishwasher, a washing machine, a dryer, an illumination apparatus, a toy, a medical apparatus, a robot, a road conditioner, a signal apparatus, and the like.

In addition, examples of the electrically driven vehicle include a railway vehicle, a golf cart, an electrically driven cart, an electric vehicle (including a hybrid car), and the like, and the battery can be used as a driving power supply or an auxiliary power supply of the vehicles.

Examples of the electrical storage device include power supplies for electrical storage of buildings starting from a house or a power generating facility.

Hereinafter, among the above-described application examples, specific examples of the electrical storage system using an electrical storage device to which the battery of the present technology is applied will be described.

As the electrical storage system, for example, the following configuration may be exemplified. A first electrical storage system is an electrical storage system in which an electrical storage device is charged by a power generator that performs power generation from renewable energy. A second electrical storage system is an electrical storage system that is provided with an electrical storage device and supplies electric power to an electronic apparatus that is connected to the electrical storage device. A third electrical storage system is an electronic apparatus to which electric power is supplied from an electrical storage device. This electrical storage system is executed as a system that realizes effective power supply in cooperation with an external power supply network.

In addition, a fourth electrical storage system is an electrically driven vehicle provided with a conversion device to which electric power is supplied from an electrical storage device and which converts the electric power to a driving force of a vehicle, and a control device that performs information processing relating to vehicle control on the basis of information relating to the electrical storage device. A fifth electrical storage system is an electric power system that is provided with an electric power information transmitting and receiving unit that transmits and receives signal to and from other apparatuses through a network, and performs charge and discharge control of the above-described electrical storage device on the basis of the information that is received by the transmitting and receiving unit. A sixth electrical storage system is an electrical power system to which electric power is supplied from the above-described electrical storage device or which supplies electric power from a power generator or a power network to the electrical storage device. Hereinafter, the electrical storage system will be described.

(4-1) Electrical Storage System in House as Application Example

Figure 8:
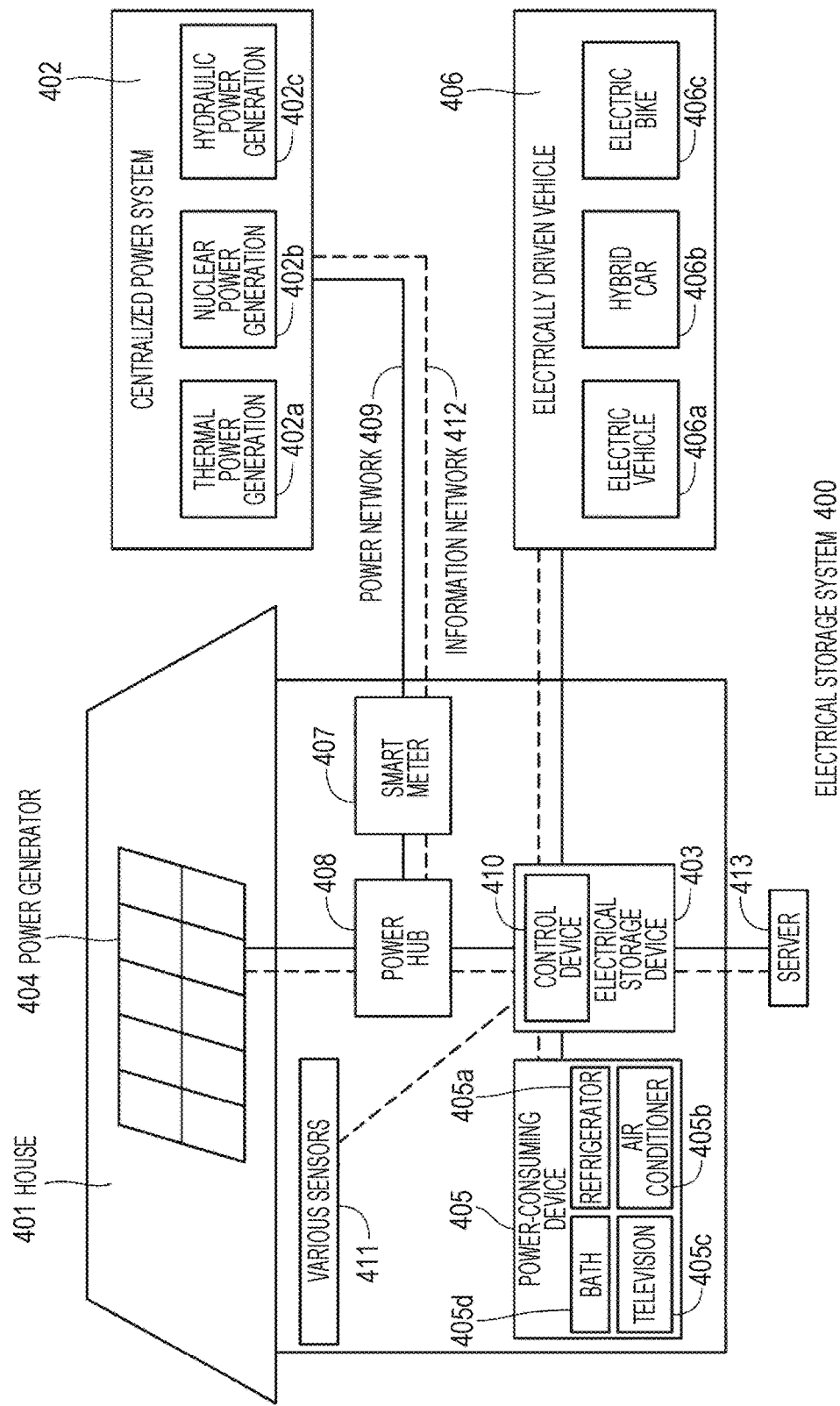
FIG. 8 is a schematic view illustrating an application example to a household electrical storage system that uses the nonaqueous electrolyte battery of present technology.

An example in which an electrical storage device using the battery of the present technology is applied to an electrical storage system for a house will be described with reference to FIG. 8. For example, in an electrical storage system 400 for a house 401, electric power is supplied to an electrical storage device 403 from a centralized power system 402 such as a thermal power generation 402a, a nuclear power generation 402b, a hydraulic power generation 402c through a power network 409, an information network 412, a smart meter 407, a power hub 408, and the like. In addition, electric power from an independent power supply such as an in-house power generator 404 is supplied to the electrical storage device 403. The electric power supplied to the electrical storage device 403 is stored. Electric power that is used in the house 401 is supplied by using the electrical storage device 403. The same electrical storage system may also be used with respect to a building without limitation to the house 401.

The power generator 404, power-consuming devices 405, the electrical storage device 403, a control device 410 that controls respective devices, the smart meter 407, and sensors 411 which acquire various pieces of information are provided to the house 401. The respective devices are connected by the power network 409 and the information network 412. As the power generator 404, a solar cell, a fuel cell, and the like are used, and generated power is supplied to the power-consuming devices 405 and/or the electrical storage device 403. Examples of the power-consuming devices 405 include a refrigerator 405a, an air-conditioner 405b, a television receiver 405c, a bath 405d, and the like. In addition, examples of the power-consuming device 405 include an electrically driven vehicle 406. Examples of the electrically driven vehicle 406 include an electric vehicle 406a, a hybrid car 406b, and an electric bike 406c.

The battery of the present technology is applied with respect to this electrical storage device 403. The battery of the present technology may be constituted by, for example, the above-described lithium ion secondary battery. The smart meter 407 has a function of measuring the amount of commercial power used and of transmitting the measured amount of commercial power used to a power company. The power network 409 may be anyone of a DC power supply type, an AC power supply type, and non-contact power supply type, or a combination of a plurality of the types.

Examples of the various sensors 411 include a motion sensing sensor, a luminance sensor, an object sensing sensor, a power-consumption sensor, a vibration sensor, a contact sensor, a temperature sensor, an infrared sensor, and the like. Information acquired by the various sensors 411 is transmitted to the control device 410. Weather conditions, conditions of human, or the like is grasped by the information transmitted from the sensors 411, and the power-consuming devices 405 are automatically controlled. Therefore, it is possible to make the energy-consumption minimal. In addition, the control device 410 may transmit information related to the house 401 to an external power company or the like through the Internet.

Processes such as divergence of power lines and DC-AC conversion are performed by the power hub 408. Examples of a communication method of the information network 412 connected to the control device 410 include a method using a communication interface such as a universal asynchronous receiver-transceiver (UART: transmission and reception circuit for asynchronous serial communication), and a method using a sensor network compliant to a wireless communication standard such as Bluetooth, ZigBee, and Wi-Fi may be exemplified. The Bluetooth method is applied to multimedia communication and can perform one-to-multi-connection communication. The ZigBee uses a physical layer of IEEE (Institute of Electrical and Electronics Engineers) 802.15.4. IEEE 802.15.4 is the name of a short-range wireless network standard called a personal area network (PAN) or wireless (W) PAN.

The control device 410 is connected to an external server 413. The server 413 may be managed by any one of the house 401, the power company, and a service provider. Examples of information that is transmitted to and received from the server 413 include power-consumption information, life pattern information, power rates, weather information, disaster information, and information related to power transaction. These kinds of information may be transmitted to and received from in-house power-consuming devices (for example, television receivers), but may be transmitted to and received from devices (for example, cellular phones, or the like) located on an outer side of the house. These kinds of information may be displayed on, for example, a television receiver, a cellular phone, a personal digital assistant (PDA), and the like which have a display function.

The control device 410 that controls each unit includes a central processing unit (CPU), a random access memory (RAM), a read only memory (ROM), and the like, and is accommodated in the electrical storage device 403 in this example. The control device 410 is connected to the electrical storage device 403, the in-house power generator 404, the power-consuming devices 405, the various sensors 411, and the server 413 through the information network 412, and has, for example, a function of adjusting the amount of commercial power used and the amount of power generation. Furthermore, in addition to this function, the control device 410 may have a function of performing power transaction in a power market, and the like.

As described above, a generated output of the in-house power generator 404 (photovoltaic generation and wind power generation) as well as the centralized power system 402 such as the thermal power generation 402a, the nuclear power generation 402b, and the hydraulic power generation 402c may be stored in the electrical storage device 403. Therefore, even when the generated output of the in-house power generator 404 varies, it is possible to make the amount of power transmitted to an outer side uniform, or it is possible to control discharging as much as necessary. For example, a method of use described below may be considered. Specifically, the electric power that is obtained from the photovoltaic generation is stored in the electrical storage device 403, and inexpensive midnight power is also stored in the electrical storage device 403 at night, and then the electric power that is stored in the electrical storage device 403 is discharged to be used in a period of time at which a rate is expensive in the day time.

In addition, in this example, description has been given of an example in which the control device 410 is accommodated in the electrical storage device 403, but the control device 410 may be accommodated in the smart meter 407, or may be configured independently. Furthermore, the electrical storage system 400 may be used in a plurality of homes as targets in regard to an apartment house, or may be used in a plurality of detached houses as targets.

(4-2) Electrical Storage System in Vehicle as Application Example

Figure 9:
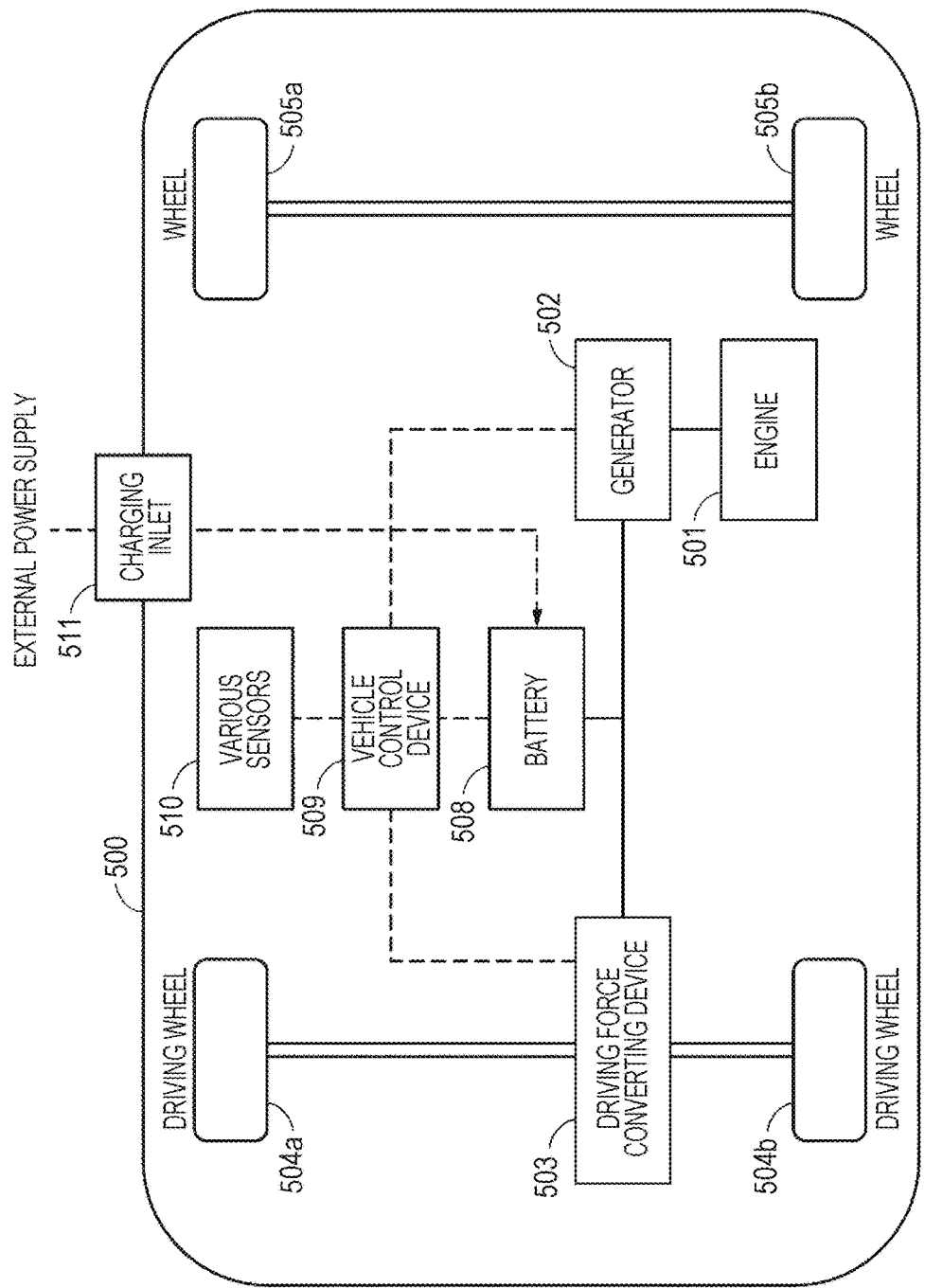
FIG. 9 is a schematic view schematically illustrating an example of a configuration of a hybrid vehicle that employs a series hybrid system to which the present technology is applied.

An example in which the present technology is applied to an electrical storage system for a vehicle will be described with reference to FIG. 9. FIG. 9 schematically illustrates a configuration example of a hybrid car that employs a series hybrid system to which the present technology is applied. The series hybrid system is a vehicle that travels with a power-driving force converting device by using electric power generated by a generator moved by an engine or the electric power that is temporarily stored in a battery.

In a hybrid vehicle 500, an engine 501, a generator 502, a power-driving force converting device 503, a driving wheel 504a, a driving wheel 504b, a wheel 505a, a wheel 505b, a battery 508, a vehicle control device 509, various sensors 510, and a charging inlet 511 are mounted. As the battery 508, the above-described battery of the present technology is applied.

The hybrid vehicle 500 travels by using the power-driving force converting device 503 as a power source. An example of the power-driving force converting device 503 is a motor. The power-driving force converting device 503 operates by electric power of the battery 508, and the torque of the power-driving force converting device 503 is transmitted to the driving wheels 504a and 504b. In addition, the power-driving force converting device 503 is applicable to an AC motor or a DC motor by using DC-AC conversion or invert conversion (AC-DC conversion) as necessary. The various sensors 510 control the engine speed or the opening degree (throttle opening degree) of a throttle valve (not illustrated) through the vehicle control device 509. Examples of the various sensors 510 include a speed sensor, an acceleration sensor, an engine speed sensor, and the like.

The torque of the engine 501 may be transmitted to the generator 502, and electric power generated by the generator 502 using the torque may be stored in the battery 508.

When the hybrid vehicle 500 is decelerated by a brake mechanism (not illustrated), a resistance force during the deceleration is added to the power-driving force converting device 503 as a torque, and regenerated electric power that is generated by the power-driving force converting device 503 due to the torque is stored in the battery 508.

When the battery 508 is connected to an external power supply on an outer side of the hybrid vehicle 500, electric power can be supplied to the battery 508 from the external power supply by using the charging inlet 511 as an input inlet, and the battery 508 can store the electric power that is supplied.

Although not illustrated, an information processing device that performs information processing related to vehicle control on the basis of information related to the secondary battery may be provided. Examples of the information processing device include an information processing device that performs displaying of a residual amount of the battery on the basis of information about the residual amount of the battery, and the like.

In addition, hereinbefore, description has been given of the series hybrid car that travels with a motor by using electric power generated by a generator moved by an engine, or the electric power that is temporarily stored in a battery as an example. However, the present technology may be effectively applied to a parallel hybrid car that uses both the output of the engine and the output of the motor as driving sources, and utilizes three types of traveling using the engine only, traveling using the motor only, and traveling using the engine and motor by appropriately changing these types. In addition, the present technology may be effectively applied to a so-called electrically driven vehicle that travels using driving by a driving motor only without using the engine.

EXAMPLES

Hereinafter, the present technology will be described in detail with reference to examples. Furthermore, the present technology is not limited to configuration of the following examples.

Example 1-1

Manufacturing of Positive Electrode

91% by mass of lithium cobaltate ($LiCoO_2$) as a positive electrode active material, 6% by mass of carbon black as a conductive agent, and 3% by mass of polyvinylidene fluoride (PVdF) as a binding agent were mixed to prepare a positive electrode mixture, and the positive electrode mixture was dispersed in N-methyl-2-pyrrolidone (NMP) as a dispersion medium as a dispersion medium, thereby obtaining positive electrode mixture slurry. The positive electrode mixture slurry was applied to both surfaces of a positive electrode current collector, which was constituted by strip-shaped aluminum foil having a thickness of 12 μm, in such a manner that a part of the positive electrode current collector was exposed. Then, the dispersion medium in the positive electrode mixture slurry that was applied was evaporated and dried, and compression molding was performed with a roll press machine, thereby forming a positive electrode active material layer. Finally, a positive electrode terminal was attached to an exposed portion of the positive electrode current collector, thereby forming a positive electrode.

[Manufacturing of Negative Electrode]

96% by mass of particle-like graphite powder having an average particle size of 20 μm as a negative electrode active material, 1.5% by mass of acrylic acid modified product of a styrene-butadiene copolymer as a binding agent, 1.5% by mass of carboxymethyl cellulose as a thickening agent were mixed to obtain a negative electrode mixture. Then, an appropriate amount of water was added to the negative electrode mixture, and the resultant mixture was stirred to prepare negative electrode mixture slurry. The negative electrode mixture slurry was applied to both surfaces of a negative electrode current collector, which was constituted by a strip-shaped copper foil having a thickness of 15 μm, in such a manner that apart of the negative electrode current collector was exposed. Next, a dispersion medium in the negative electrode mixture slurry that was applied was evaporated and dried, and then compression molding was performed with a roll press machine, thereby forming a negative electrode active material layer. Finally, a negative electrode terminal was attached to an exposed portion of the positive electrode current collector, thereby forming a negative electrode.

[Formation of Gel Electrolyte Layer]

Lithium hexafluorophosphate ($LiPF_6$) as an electrolyte salt was dissolved in a nonaqueous solvent, in which ethylene carbonate (EC), propylene carbonate (PC), and vinylene carbonate (VC) were mixed in a mass ratio of 49:49:2, in a concentration of 1 mol/$dm^3$, thereby preparing a nonaqueous electrolytic solution.

Subsequently, polyvinylidene fluoride (PVdF) as a matrix polymer compound (resin) for retention of the nonaqueous electrolytic solution was used. The nonaqueous electrolyte solution, the polyvinylidene fluoride, dimethyl carbonate (DMC) as a dilution solvent, and boehmite particles (refractive index: 1.7) as filler were mixed with each other to prepare a sol-like precursor solution.

Furthermore, the precursor solution contained a dilution solvent (DMC) in the same mass as that of the nonaqueous solvent in addition to constituent components (boehmite particles: 10% by mass, a matrix polymer compound (PVdF): 10% by mass, $LiPF_6$: 10% by mass, and a nonaqueous solvent: 70% by mass) of the gel electrolyte layer. A mass ratio (boehmite particle/$LiPF_6$) between the boehmite particles and LiPF$_6$ was set to 50/50, and amass ratio (boehmite particle/PVdF) between the boehmite particles and PVdF was set to 50/50.

Subsequently, the precursor solution was applied to both surfaces of the positive electrode and the negative electrode, and was dried to remove the dilution solvent (DMC). Adjustment was performed to obtain a film thickness of 5 μm, thereby forming the gel electrolyte layer on the surfaces of the positive electrode and the negative electrode.

[Assembly of Laminated Film Type Battery]

The positive electrode and the negative electrode in which the gel electrolyte layer was formed on both surfaces thereof, and the separator were laminated in the order of the positive electrode, the separator, the negative electrode, and the separator, and the resultant laminated body was wound a plurality of times in a flat shape along a longitudinal direction thereof by using a winding device. Then, a winding end portion was fixed with an adhesive tape to form a wound electrode body. Furthermore, a winding device was configured to have a function of transmitting image data obtained through photographing with a camera to an image processing device, detecting positions of edges of the positive electrode, the separator, and the negative electrode from the image data, feeding back the detection result, and controlling the position of the positive electrode, the separator, and the negative electrode in a width direction to a correct position. In the winding device, detection of the position of the edges of the positive electrode, the separator, and the negative electrode was performed with respect to only one reference side on one side. In a case where a winding deviation occurs due to erroneous detection, there is a concern that the edges of the positive and negative electrodes which are opposite to the one reference side may protrude from the separator, and thus short-circuit may occur.

Next, the wound electrode body was packaged with a laminated film including a soft aluminum layer, and a side of the laminated film, from which the positive electrode terminal and the negative electrode terminal were led out, at the periphery of the wound electrode body, and other two sides of the laminated film were sealed through thermal fusion at a reduced pressure and were hermetically closed. According to this, a laminated film type battery illustrated in FIG. 1, in which a battery shape had a thickness of 4.5 mm, a width of 30 mm, and a height of 50 mm, was manufactured.

Example 1-2 to Examples 1-55

In Example 1-2 to Examples 1-55, laminated film type batteries were manufactured in the same manner as in Example 1-1 except that filler that was used was changed as illustrated in the following Table 1.

Comparative Example 1-1

A laminated film type battery of Comparative Example 1-1 was manufactured in the same manner as in Example 1-1 except that the filler (boehmite particles) was not mixed to the precursor solution, and a gel electrolyte layer, which did not contain the filler, was formed.

Comparative Example 1-2 to Comparative Example 1-10

In Comparative Example 1-2 to Comparative Example 1-10, laminated film type batteries were manufactured in the same manner as in Example 1-1 except that the filler that was used was changed as illustrated in the following Table 1.

(Plane Rate of Filler, and External Appearance of Gel Electrolyte Layer)

In the above-described Examples and Comparative Examples, a plane rate of the filler and the external appearance of the gel electrolyte layer were measured and evaluated as follows. (This is true of the following Examples and Comparative Examples)

(Measurement of Plane Rate)

The plane rate was measured as follows. The gel electrolyte layer was observed with a SEM in a direction perpendicular to a contact surface of the gel electrolyte layer with an electrode, a picture of 10 particles, which had a typical shape in a size approximately equal to a 50% average size (D50) on a volume basis, was taken. Furthermore, the average particle size (D50) represents a value that was measured by observing a powder, which was obtained by removing a gel electrolyte component and the like from the gel electrolyte layer 56, with a laser diffraction particle size analyzer. Next, with respect to respective particles, a projection area of a plane (in a case where a plurality of the planes exist, a total area thereof) equivalent to the crystal plane, the broken plane, or the cleavage plane in a projection area was obtained to calculate the percentage of the projection area of the plane with respect to a projection area of all of the particles, and then an average value of the calculated percentages of the respective particles was set as the plane rate.

(Evaluation of External Appearance)

The external appearance of the gel electrolyte layer was observed through visual observation. Furthermore, evaluation was performed in a step wise manner such as "transparent", "almost transparent", "close to transparent", and "translucent" on the basis of the degree of transparency. In the case of the "transparent", "almost transparent", and "close to transparent", in any case, the contour of an application target (the electrodes or the separator) could be visually recognized in a perfect manner through the gel electrolyte layer. In addition, in accordance with the degree of chroma of white turbidity, evaluation was performed in a step wise manner such as "light white turbidity", "white turbidity", and "dark white turbidity". In the case of "light white turbidity", "white turbidity", "dark white turbidity", and "brown opacity", it was difficult to visually recognize the contour of the application target (the electrodes or the separator) through the gel electrolyte layer 56.

(Evaluation of Battery: Winding Deviation Short-Circuit Inspection)

As described below, a short-circuit inspection was performed so as to confirm whether or not short-circuit due to a winding deviation occurred. With respect to a battery that was manufactured, whether or not the short-circuit due to the winding deviation at initial charging of the battery occurred was confirmed. Specifically, in a case where a decrease in a voltage by 0.5 V or greater occurred until 24 hours had passed after the initial charging of the battery was terminated, this case was determined as short-circuit. In this manner, whether or not the short-circuit occurred was confirmed.

Furthermore, the battery was constant-current charged until a battery voltage at a constant current of 1 C reached 4.2 V under an atmosphere of 23° C. Then, the battery was constant-voltage charged at a constant voltage of 4.2 V until a total of charging time reached 2.5 hours.

(Evaluation of Battery: Measurement of Battery Capacity)

With respect to a battery in which short-circuiting did not occur during the short-circuit inspection, a battery capacity was measured as follows. The battery that was charged was constant-current discharged with a discharge current of 1 C until a battery voltage reached 3.0 V, and a discharge capacity at this time was measured and was set as the battery capacity. The battery capacity was determined whether or not a necessary battery capacity was satisfied with a required capacity of 1000 mAh, which was required for the battery that was manufactured, set as a reference value. Furthermore, in Comparative Example 1-2 to Comparative Example 1-10, short-circuiting occurred, and thus the measurement of the battery capacity was impossible.

(Evaluation of Battery: Battery Bending Test)

Figure 10:
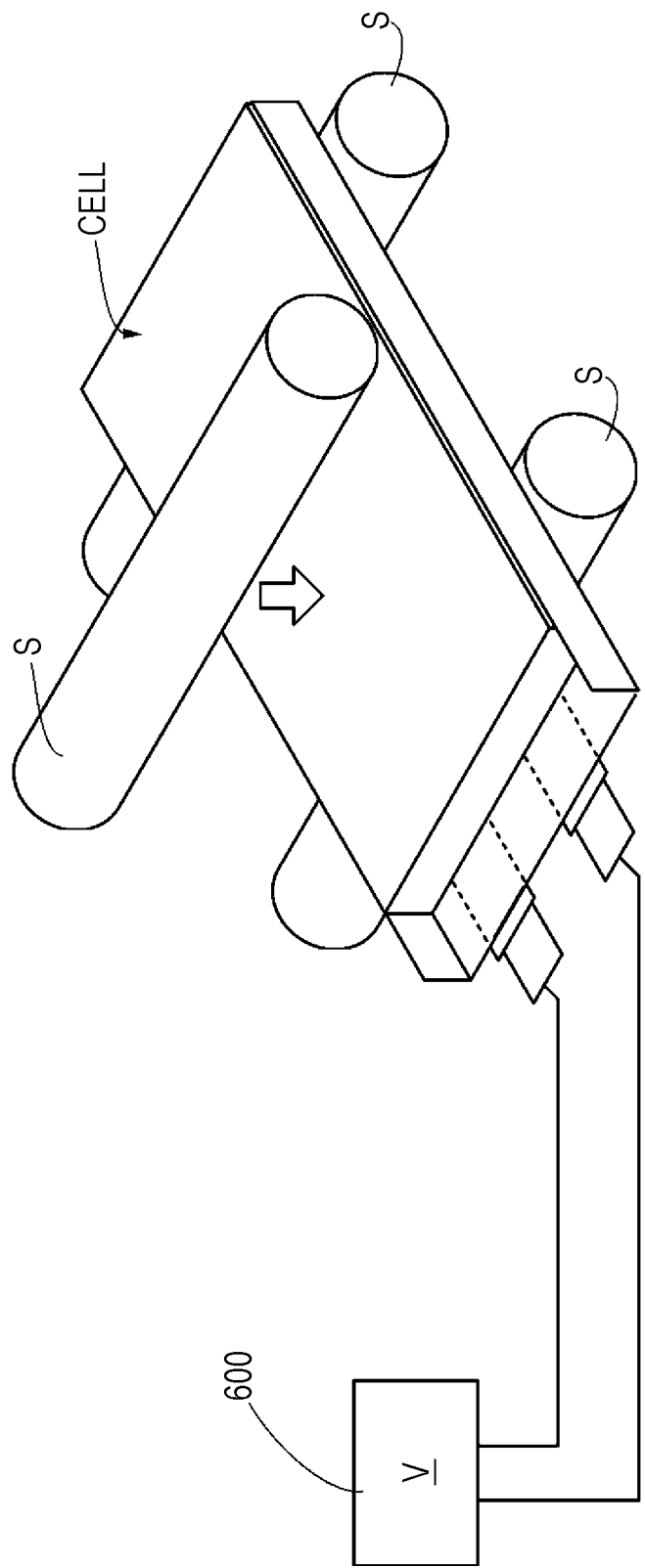
FIG. 10 is a schematic view illustrating a battery bending test.
Figure 11:
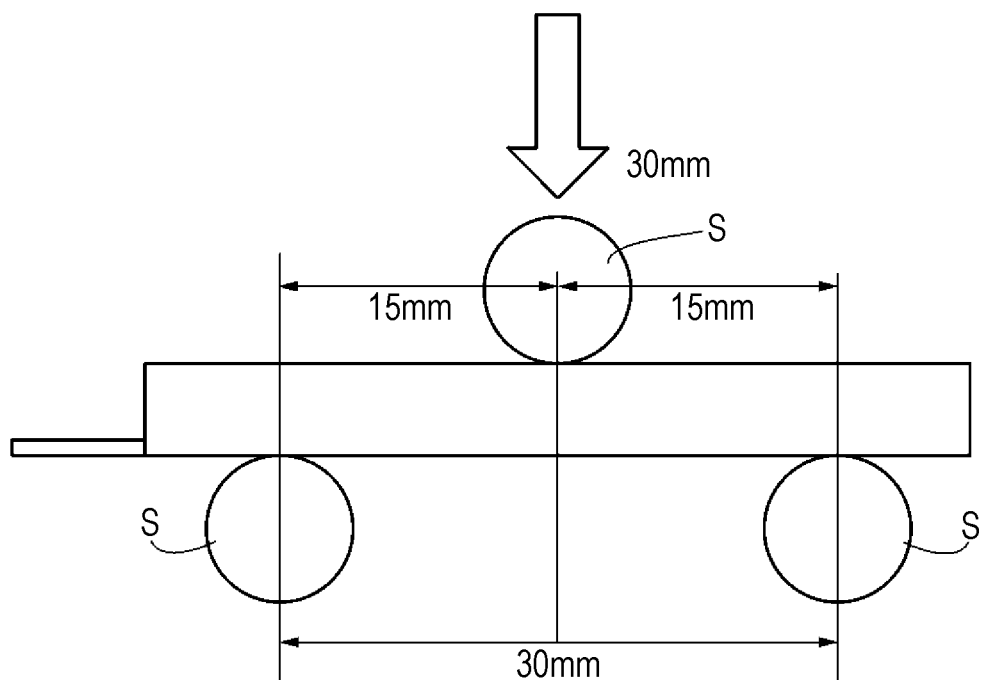
FIG. 11 is a schematic cross-sectional view illustrating the battery bending test.

The battery, which was manufacture, was charged under the same conditions as in the measurement of the battery capacity. Next, as illustrated in FIGS. 10 and 11, a charged battery CELL was disposed on two round rods S which were arranged in parallel with a gap of 30 mm. One round rod S was pressed to the central position of the battery CELL from an upper side, and pressing was performed with 300 N or until a pressed portion was bent by 3 mm (reached a state in which the pressed portion was lowered by 3 mm to a lower side). At that time, a voltage of the battery CELL was confirmed with a voltmeter (tester) 600. When a voltage drop by 1% or greater was confirmed, short-circuit determination was made as failing. In addition, in a case of the short-circuit, this case was regarded as "test was impossible", and the other cases were regarded as "passing".

Evaluation results are illustrated in Table 1.

TABLE 1

Electrode Structure: Winding Type, Laminated Film Battery

| | Gel electrolyte | | | | | | Evaluation | | |
|---|---|---|---|---|---|---|---|---|---|
| | Filler | | | | | | Winding | | |
| | Kind of material | Plane rate [%] | Refractive index | Matrix polymer | Application target | External appearance | deviation short-circuit inspection | Battery capacity [mAh] | Battery bending test |
| Example 1-1 | Boehmite | 75 | 1.7 | PVdF | Positive and negative electrodes | Transparent | Passing | 1050 | Passing |
| Example 1-2 | Talc | | 1.6 | | | Transparent | Passing | 1050 | Passing |
| Example 1-3 | Zinc oxide | | 2.0 | | | Transparent | Passing | 1050 | Passing |
| Example 1-4 | Tin oxide | | 2.0 | | | Transparent | Passing | 1050 | Passing |
| Example 1-5 | Silicon oxide | | 1.5 | | | Transparent | Passing | 1050 | Passing |
| Example 1-6 | Magnesium oxide | | 1.7 | | | Transparent | Passing | 1050 | Passing |
| Example 1-7 | Antimony oxide | | 2.1 | | | Transparent | Passing | 1050 | Passing |
| Example 1-8 | Aluminum oxide | | 1.8 | | | Transparent | Passing | 1050 | Passing |
| Example 1-9 | Magnesium sulfate | | 1.5 | | | Transparent | Passing | 1050 | Passing |
| Example 1-10 | Calcium sulfate | | 1.6 | | | Transparent | Passing | 1050 | Passing |
| Example 1-11 | Barium sulfate | | 1.6 | | | Transparent | Passing | 1050 | Passing |
| Example 1-12 | Strontium sulfate | | 1.5 | | | Transparent | Passing | 1050 | Passing |
| Example 1-13 | Magnesium carbonate | | 1.5 | | | Transparent | Passing | 1050 | Passing |
| Example 1-14 | Calcium carbonate | | 1.6 | | | Transparent | Passing | 1050 | Passing |
| Example 1-15 | Barium carbonate | | 1.6 | | | Transparent | Passing | 1050 | Passing |
| Example 1-16 | Lithium carbonate | | 1.5 | | | Transparent | Passing | 1050 | Passing |
| Example 1-17 | Magnesium hydroxide | | 1.6 | | | Transparent | Passing | 1050 | Passing |
| Example 1-18 | Aluminum hydroxide | | 1.3 | | | Transparent | Passing | 1050 | Passing |
| Example 1-19 | Zinc hydroxide | | 1.5 | | | Transparent | Passing | 1050 | Passing |
| Example 1-20 | Boron carbide | | 1.5 | | | Transparent | Passing | 1050 | Passing |
| Example 1-21 | Silicon nitride | | 2.0 | | | Transparent | Passing | 1050 | Passing |
| Example 1-22 | Boron nitride | | 2.1 | | | Transparent | Passing | 1050 | Passing |
| Example 1-23 | Aluminum nitride | 75 | 2.1 | PVdF | | Transparent | Passing | 1050 | Passing |
| Example 1-24 | Titanium nitride | | 1.3 | | | Transparent | Passing | 1050 | Passing |
| Example 1-25 | Lithium fluoride | | 1.4 | | | Transparent | Passing | 1050 | Passing |
| Example 1-26 | Aluminum fluoride | | 1.3 | | | Transparent | Passing | 1050 | Passing |
| Example 1-27 | Calcium fluoride | | 1.4 | | | Transparent | Passing | 1050 | Passing |
| Example 1-28 | Barium fluoride | | 1.5 | | | Transparent | Passing | 1050 | Passing |
| Example 1-29 | Magnesium fluoride | | 1.4 | | | Transparent | Passing | 1050 | Passing |
| Example 1-30 | Trilithium phosphate | | 1.5 | | | Transparent | Passing | 1050 | Passing |
| Example 1-31 | Magnesium phosphate | | 1.5 | | | Transparent | Passing | 1050 | Passing |
| Example 1-32 | Magnesium hydrogenphosphate | | 1.5 | | | Transparent | Passing | 1050 | Passing |
| Example 1-33 | Calcium silicate | | 1.6 | | | Transparent | Passing | 1050 | Passing |
| Example 1-34 | Zinc silicate | | 1.6 | | | Transparent | Passing | 1050 | Passing |
| Example 1-35 | Zirconium silicate | | 2.0 | | | Transparent | Passing | 1050 | Passing |
| Example 1-36 | Aluminum silicate | | 1.7 | | | Transparent | Passing | 1050 | Passing |
| Example 1-37 | Magnesium Silicate | | 1.6 | | | Transparent | Passing | 1050 | Passing |
| Example 1-38 | Spinel | | 1.7 | | | Transparent | Passing | 1050 | Passing |
| Example 1-39 | Hydrotalcite | | 1.5 | | | Transparent | Passing | 1050 | Passing |
| Example 1-40 | Dolomite | | 1.6 | | | Transparent | Passing | 1050 | Passing |
| Example 1-41 | Kaolinite | | 1.6 | | | Transparent | Passing | 1050 | Passing |
| Example 1-42 | Sepiolite | | 1.5 | | | Transparent | Passing | 1050 | Passing |

TABLE 1-continued

Electrode Structure: Winding Type, Laminated Film Battery

| | Gel electrolyte | | | | | | Evaluation | | |
|---|---|---|---|---|---|---|---|---|---|
| | Filler | | | | | | Winding | | |
| | Kind of material | Plane rate [%] | Refractive index | Matrix polymer | Application target | External appearance | deviation short-circuit inspection | Battery capacity [mAh] | Battery bending test |
| Example 1-43 | Imogolite | | 1.5 | | | Transparent | Passing | 1050 | Passing |
| Example 1-44 | Sericite | | 1.6 | | Positive | Transparent | Passing | 1050 | Passing |
| Example 1-45 | Pyrophyllite | | 1.6 | | and | Transparent | Passing | 1050 | Passing |
| Example 1-46 | Mica | | 1.6 | | negative | Transparent | Passing | 1050 | Passing |
| Example 1-47 | Zeolite | | 1.5 | | electrodes | Transparent | Passing | 1050 | Passing |
| Example 1-48 | Mullite | | 1.5 | | | Transparent | Passing | 1050 | Passing |
| Example 1-49 | Saponite | | 1.5 | | | Transparent | Passing | 1050 | Passing |
| Example 1-50 | Attapulgite | | 1.5 | | | Transparent | Passing | 1050 | Passing |
| Example 1-51 | Montmorillonite | | 1.5 | | | Transparent | Passing | 1050 | Passing |
| Example 1-52 | Melamine | | 1.6 | | | Transparent | Passing | 1050 | Passing |
| Example 1-53 | Ammonium polyphosphate | | 1.6 | | | Transparent | Passing | 1050 | Passing |
| Example 1-54 | Melamine cyanurate | | 1.6 | | | Transparent | Passing | 1050 | Passing |
| Example 1-55 | Melamine polyphosphate | | 1.6 | | | Transparent | Passing | 1050 | Passing |
| Comparative Example 1-1 | — | — | — | PVdF | Positive and negative electrodes | Transparent | Passing | 1050 | Failing |
| Comparative Example 1-2 | Zirconium oxide | 75 | 2.4 | | | Dark white turbidity | Failing | Test was impossible | Test was impossible |
| Comparative Example 1-3 | Cerium oxide | | 2.2 | | | Dark white turbidity | Failing | Test was impossible | Test was impossible |
| Comparative Example 1-4 | Barium titanate | | 2.4 | | | Dark white turbidity | Failing | Test was impossible | Test was impossible |
| Comparative Example 1-5 | Strontium titanate | | 2.4 | | | Dark white turbidity | Failing | Test was impossible | Test was impossible |
| Comparative Example 1-6 | Titanium oxide | | 2.6 | | | Dark white turbidity | Failing | Test was impossible | Test was impossible |
| Comparative Example 1-7 | Diamond | | 2.4 | | | Dark white turbidity | Failing | Test was impossible | Test was impossible |
| Comparative Example 1-8 | Silicon carbide (colored particles) | | — | | | Brown opacity | Failing | Test was impossible | Test was impossible |
| Comparative Example 1-9 | Iron oxide (colored particles) | | — | | | Brown opacity | Failing | Test was impossible | Test was impossible |
| Comparative Example 1-10 | Silicon (colored particles) | | — | | | Brown opacity | Failing | Test was impossible | Test was impossible |

As illustrated in Table 1, in Examples 1-1 to Example 1-55, the gel electrolyte contained particles which had a plane rate in a predetermined range, and a refractive index in a predetermined range. Accordingly, the external appearance was transparent, the battery capacity did not deteriorate (equal to or greater than the required capacity of 1000 mAh), the winding deviation short-circuit inspection and the battery bending test were regarded as "passing", and stability also could be secured. On the other hand, in Comparative Example 1-1, the gel electrolyte did not contain the particles, and thus strength was deficient, and the battery bending test was regarded as "failing". In Comparative Example 1-2 to Comparative Example 1-10, the gel electrolyte contained particles which did not have at least any one of the plane rate in a predetermined range, and the refractive index in a predetermined range. Therefore, the gel electrolyte was not transparent, and the winding deviation short-circuit inspection and the battery bending test were regarded as "failing". In addition, short-circuit occurred, and thus the battery capacity test was impossible (measurement was impossible).

Example 2-1

A laminated film type batter was manufactured in the same manner as Example 1-1.

Example 2-2 to Example 2-7

As the filler, boehmite particles having a different plane rate were used. The plane rate of the boehmite particles was adjusted to a desired value as follows. A growth rate during hydrothermal synthesis of the boehmite particles was raised to increase the proportion of a spherical surface, or the growth rate was lowered to increase the plane rate. Specifically, in Example 2-2, boehmite particles having a plane rate of 45% were used as the filler. In Example 2-3, boehmite particles having a plane rate of 50% were used as the filler. In Example 2-4, boehmite particles having a plane rate of 60% were used as the filler. In Example 2-5, boehmite particles having a plane rate of 80% were used as the filler. In Example 2-6, boehmite particles having a plane rate of 90% were used as the filler. In Example 2-7, boehmite particles having a plane rate of 100% were used as the filler. Laminated film type batteries were manufactured in the same manner as in Example 2-1 except for the above-described configurations.

Example 2-8

A laminated film type battery was manufactured in the same manner as in Example 1-2.

Example 2-9 to Example 2-14

As the filler, talc particles having a different plane rate were used. Furthermore, in a pulverization process that was performed by using a hammer mill and a roll mill, the plane rate of the talc particles was adjusted to a desired value as follows. The time proportion of the hammer mill was raised to increase the proportion of the cleavage plane, or the time proportion of the roll mill was raised to decrease the proportion of the cleavage plane.

Specifically, in Example 2-9, talc particles having a plane rate of 45% were used as the filler. In Example 2-10, talc particles having a plane rate of 50% were used as the filler. In Example 2-11, talc particles having a plane rate of 60% were used as the filler. In Example 2-12, talc particles having a plane rate of 80% were used as the filler. In Example 2-13, talc particles having a plane rate of 90% were used as the filler. In Example 2-14, talc particles having a plane rate of 100% were used as the filler. Laminated film type batteries were manufactured in the same manner as in Example 2-8 except for the above-described configurations.

Comparative Example 2-1 to Comparative Example 2-5

Instead of the boehmite particles, aluminum oxide particles having a different plane rate were used as the filler. Specifically, in Comparative Example 2-1, aluminum oxide particles having a plane rate of 40% were used as the filler. In Comparative Example 2-2, aluminum oxide particles having a plane rate of 30% were used as the filler. In Comparative Example 2-3, aluminum oxide particles having a plane rate of 20% were used as the filler. In Comparative Example 2-4, aluminum oxide particles having a plane rate of 10% were used as the filler. In Comparative Example 2-5, aluminum oxide particles (plane rate: 0%) having a spherical shape were used as the filler. Laminated film type batteries were manufactured in the same manner as in Example 2-1 except for the above-described configurations.

Comparative Example 2-6

As the positive electrode, an electrode, of which a positive electrode width was made to be narrower than a positive electrode width of Example 2-1 by 10%, was used. A laminated film type battery was manufactured in the same manner as in Comparative Example 2-5 except for the above-described configurations.

[Evaluation of Battery: Winding Deviation Short-Circuit Inspection, Measurement of Battery Capacity, and Battery Bending Test]

With respect to the manufactured laminated film type batteries of respective Examples and Comparative Examples, the winding deviation short-circuit inspection, the measurement of the battery capacity, and the battery bending test were performed in the same manner as in Example 1-1.

Evaluation results are illustrated in Table 2.

TABLE 2

| | Electrode Structure: Winding Type, Laminated Film Battery | | | | | | | | |
|---|---|---|---|---|---|---|---|---|---|
| | Gel electrolyte | | | | | | Evaluation | | |
| | Filler | | | | | | Winding | | |
| | Kind of material | Plane rate [%] | Refractive index | Matrix polymer | Application target | External appearance | deviation short-circuit inspection | Battery capacity [mAh] | Battery bending test |
| Example 2-1 | Boehmite | 75 | 1.7 | PVdf | Positive and negative electrodes | Transparent | Passing | 1050 | Passing |
| Example 2-2 | | 45 | 1.7 | | | Close to transparent | Passing | 1050 | Passing |
| Example 2-3 | | 50 | 1.7 | | | Almost transparent | Passing | 1050 | Passing |
| Example 2-4 | | 60 | 1.7 | | | Transparent | Passing | 1050 | Passing |
| Example 2-5 | | 80 | 1.7 | | | Transparent | Passing | 1050 | Passing |
| Example 2-6 | | 90 | 1.7 | | | Transparent | Passing | 1050 | Passing |
| Example 2-7 | | 100 | 1.7 | | | Transparent | Passing | 1050 | Passing |
| Example 2-8 | Talc | 75 | 1.6 | PVdf | Positive and negative electrodes | Transparent | Passing | 1050 | Passing |
| Example 2-9 | | 45 | 1.6 | | | Close to transparent | Passing | 1050 | Passing |
| Example 2-10 | | 50 | 1.6 | | | Almost transparent | Passing | 1050 | Passing |
| Example 2-11 | | 60 | 1.6 | | | Transparent | Passing | 1050 | Passing |
| Example 2-12 | | 80 | 1.6 | | | Transparent | Passing | 1050 | Passing |
| Example 2-13 | | 90 | 1.6 | | | Transparent | Passing | 1050 | Passing |
| Example 2-14 | | 100 | 1.6 | | | Transparent | Passing | 1050 | Passing |
| Comparative Example 2-1 | Aluminum oxide | 40 | 1.8 | PVdf | Positive and negative electrodes | Translucent | Failing | Test was impossible | Test was impossible |
| Comparative Example 2-2 | | 30 | 1.8 | PVdf | | Light white turbidity | Failing | Test was impossible | Test was impossible |
| Comparative Example 2-3 | | 20 | 1.8 | PVdf | | White turbidity | Failing | Test was impossible | Test was impossible |
| Comparative Example 2-4 | | 10 | 1.8 | PVdf | | Dark white turbidity | Failing | Test was impossible | Test was impossible |
| Comparative Example 2-5 | | 0 (Spherical body) | 1.8 | PVdf | | Dark white turbidity | Failing | Test was impossible | Test was impossible |

TABLE 2-continued

Electrode Structure: Winding Type, Laminated Film Battery

| | Gel electrolyte | | | | | Evaluation | | |
|---|---|---|---|---|---|---|---|---|
| | Filler | | | | | Winding | | |
| | Kind of material | Plane rate [%] | Refractive index | Matrix polymer | Application target | External appearance | deviation short-circuit inspection | Battery capacity [mAh] | Battery bending test |
| Comparative Example 2-6 | | 0 (Spherical body) | 1.8 | PVdf | *1 | Dark white turbidity | Passing | 950 | Passing |

*1: Positive and negative electrodes (a positive electrode width was made to be narrower by 10%)

As illustrated in Table 2, in Examples 2-1 to Example 2-14, the gel electrolyte layer contained particles which had a plane rate in a predetermined range, and a refractive index in a predetermined range. Accordingly, the external appearance was transparent, the battery capacity did not deteriorate (equal to or greater than the required capacity of 1000 mAh), the winding deviation short-circuit inspection and the battery bending test were regarded as "passing", and stability also could be secured. On the other hand, in Comparative Example 2-1 to Comparative Example 2-5, the gel electrolyte layer contained particles which did not have at least any one of the plane rate in a predetermined range, and the refractive index in a predetermined range. Therefore, the gel electrolyte was not transparent, and the winding deviation short-circuit inspection and the battery bending test were regarded as "failing". In addition, short-circuit occurred, and thus the battery capacity test was impossible (measurement was impossible). Furthermore, in Comparative Example 2-6, as is the case with the related art, the positive electrode width was made to be narrower than the positive electrode width of Example 2-1 by 10%, and thus the winding deviation was great. However, the clearance between respective edges of the positive electrode, the negative electrode, and the separator was also great, and thus short-circuit did not occur. However, the battery capacity did not reach the required capacity of 1000 mAh.

Example 3-1 to Example 3-8

In Example 3-1 to Example 3-8, laminated film type batteries were manufactured in the same manner as in Example 1-1 except that the amount of each of the components including the filler (boehmite particles), the matrix polymer (PVdF), LiPF$_6$, and the nonaqueous solvent (solvent), which are constituent components of the gel electrolyte, was changed as illustrated in the following Table 3. Furthermore, in Table 3, the amount of each of the components including the particles (filler), PVdF, LiPF$_6$, and the solvent is expressed by the mass percentage on the basis of the total amount of the gel electrolyte (the total amount of the constituent components) (this is true of the following Table 8).

Example 3-9 to Example 3-15

In Example 3-9 to Example 3-15, laminated film type batteries were manufactured in the same manner as in Example 1-2 except that the amount of each of the components including the filler (talc particles), the matrix polymer (PVdF), LiPF$_6$, and the solvent, which are constituent components of the gel electrolyte, was changed as illustrated in the following Table 3.

[Evaluation of Battery: Winding Deviation Short-circuit Inspection, Measurement of Battery Capacity, and Battery Bending Test]

With respect to the manufactured laminated film type batteries of respective Examples, the winding deviation short-circuit inspection, the measurement of the battery capacity, and the battery bending test were performed in the same manner as in Example 1-1.

Evaluation results are illustrated in Table 3.

TABLE 3

Electrode Structure: Winding Type, Laminated Film Battery

| | Gel electrolyte | | | | | | | |
|---|---|---|---|---|---|---|---|---|
| | Filler | | | | | | | |
| | Kind of material | Plane rate [%] | Refractive index | Particles [% by mass] | PVdF [% by mass] | LiPF$_6$ [% by mass] | Solvent [% by mass] | Mass ratio Particle/PVdF |
| Example 3-1 | Boehmite | 75 | 1.7 | 5.2 | 29.3 | 29.3 | 36.2 | 15/85 |
| Example 3-2 | | | | 7.7 | 30.8 | 7.7 | 53.8 | 20/80 |
| Example 3-3 | | | | 8.8 | 20.6 | 8.8 | 61.8 | 30/70 |
| Example 3-4 | | | | 10.0 | 10.0 | 10.0 | 70.0 | 50/50 |
| Example 3-5 | | | | 20.6 | 8.8 | 8.8 | 61.8 | 70/30 |
| Example 3-6 | | | | 30.8 | 7.7 | 7.7 | 53.8 | 80/20 |
| Example 3-7 | | | | 38.7 | 6.8 | 6.8 | 47.7 | 85/15 |
| Example 3-8 | | | | 50.0 | 5.6 | 5.6 | 38.9 | 90/10 |
| Example 3-9 | Talc | 75 | 1.6 | 7.7 | 7.7 | 30.8 | 53.8 | 50/50 |
| Example 3-10 | | | | 8.8 | 8.8 | 20.6 | 61.8 | 50/50 |

TABLE 3-continued

Electrode Structure: Winding Type, Laminated Film Battery

| | | | | | |
|---|---|---|---|---|---|
| Example 3-11 | 10.0 | 10.0 | 10.0 | 70.0 | 50/50 |
| Example 3-12 | 20.6 | 8.8 | 8.8 | 61.8 | 70/30 |
| Example 3-13 | 30.8 | 7.7 | 7.7 | 53.8 | 80/20 |
| Example 3-14 | 38.7 | 6.8 | 6.8 | 47.7 | 85/15 |
| Example 3-15 | 50.0 | 5.6 | 5.6 | 38.9 | 90/10 |

| | Gel electrolyte | | | Evaluation | | |
|---|---|---|---|---|---|---|
| | Mass ratio Particle/LiPF$_6$ | Application target | External appearance | Winding deviation short-circuit inspection | Battery capacity [mAh] | Battery bending test |
| Example 3-1 | 15/85 | Positive and negative electrodes | Transparent | Passing | 1050 | Passing |
| Example 3-2 | 50/50 | | Transparent | Passing | 1050 | Passing |
| Example 3-3 | 50/50 | | Transparent | Passing | 1050 | Passing |
| Example 3-4 | 50/50 | | Transparent | Passing | 1050 | Passing |
| Example 3-5 | 70/30 | | Transparent | Passing | 1050 | Passing |
| Example 3-6 | 80/20 | | Transparent | Passing | 1050 | Passing |
| Example 3-7 | 85/15 | | Almost transparent | Passing | 1050 | Passing |
| Example 3-8 | 90/10 | | Close to transparent | Passing | 1050 | Passing |
| Example 3-9 | 20/80 | Positive and negative electrodes | Transparent | Passing | 1050 | Passing |
| Example 3-10 | 30/70 | | Transparent | Passing | 1050 | Passing |
| Example 3-11 | 50/50 | | Transparent | Passing | 1050 | Passing |
| Example 3-12 | 70/30 | | Transparent | Passing | 1050 | Passing |
| Example 3-13 | 80/20 | | Transparent | Passing | 1050 | Passing |
| Example 3-14 | 85/15 | | Almost transparent | Passing | 1050 | Passing |
| Example 3-15 | 90/10 | | Close to transparent | Passing | 1050 | Passing |

As illustrated in Table 3, in Examples 3-1 to Example 3-15, the gel electrolyte contained particles which had a plane rate in a predetermined range, and a refractive index in a predetermined range. Accordingly, the external appearance was transparent, the battery capacity did not deteriorate (equal to or greater than the required capacity of 1000 mAh), the winding deviation short-circuit inspection and the battery bending test were regarded as "passing", and stability also could be secured. In addition, it was confirmed that the degree of transparency could be changed by changing the ratio (mixing ratio) between the particles and the matrix polymer compound, and/or the ratio (mixing ratio) between the particles and the electrolyte salt.

Example 4-1

In Example 4-1, a laminated film type battery was manufactured in the same manner in Example 1-1.

Example 4-2 and Example 4-3

In Example 4-2 and Example 4-3, the kind of the matrix polymer (resin), which constitutes the gel electrolyte layer, was changed. In Example 4-2, polyacrylonitrile (PAN) was used as the matrix polymer. In Example 4-3, polyethylene glycol (PEG) was used as the matrix polymer. Laminated film type batteries were manufactured in the same manner as in Example 4-1 except for the above-described configurations.

Example 4-4

In Example 4-4, a laminated film type battery was manufactured in the same manner as in Example 1-2.

Example 4-5 and Example 4-6

In Example 4-5 and Example 4-6, the kind of the matrix polymer, which constitutes the gel electrolyte layer, was changed. In Example 4-5, polyacrylonitrile (PAN) was used as the matrix polymer. In Example 4-6, polyethylene glycol (PEG) was used as the matrix polymer. Laminated film type batteries were manufactured in the same manner as in Example 4-4 except for the above-described configurations.

[Evaluation of Battery: Winding Deviation Short-Circuit Inspection, Measurement of Battery Capacity, and Battery Bending Test]

With respect to the manufactured laminated film type batteries of respective Examples, the winding deviation short-circuit inspection, the measurement of the battery capacity, and the battery bending test were performed in the same manner as in Example 1-1.

Evaluation results are illustrated in Table 4.

TABLE 4

Electrode Structure: Winding Type, Laminated Film Battery

| | Gel electrolyte | | | | | Evaluation | | |
|---|---|---|---|---|---|---|---|---|
| | Filler | | | | | Winding | | |
| | Kind of material | Plane rate [%] | Refractive index | Matrix polymer | Application target | External appearance | deviation short-circuit inspection | Battery capacity [mAh] | Battery bending test |
| Example 4-1 | Boehmite | 75 | 1.7 | PVdF | Positive | Transparent | Passing | 1050 | Passing |
| Example 4-2 | | | | PAN | and | Transparent | Passing | 1050 | Passing |
| Example 4-3 | | | | PEG | negative electrodes | Transparent | Passing | 1050 | Passing |
| Example 4-4 | Talc | 75 | 1.6 | PVdF | Positive | Transparent | Passing | 1050 | Passing |
| Example 4-5 | | | | PAN | and | Transparent | Passing | 1050 | Passing |
| Example 4-6 | | | | PEG | negative electrodes | Transparent | Passing | 1050 | Passing |

As illustrated in Table 4, in Example 4-1 to Example 4-6, the gel electrolyte layer contained particles which had a plane rate in a predetermined range, and a refractive index in a predetermined range. Accordingly, the external appearance was transparent, the battery capacity did not deteriorate (equal to or greater than the required capacity of 1000 mAh), the winding deviation short-circuit inspection and the battery bending test were regarded as "passing", and stability also could be secured.

Example 5-1 and Example 5-2

In Example 5-1 and Example 5-2, the configuration of each of the positive electrode, the negative electrode, the separator, and the gel electrolyte layer was the same as in each of Example 1-1 and Example 1-2, and laminated film type batteries, in which the laminated electrolyte body was packaged with a laminated film, were manufactured.

[Assembly of Laminated Film Type Battery]

The same precursor solution as in Example 1-1 or Example 1-2 was applied to both surfaces of the rectangular positive and negative electrodes and was dried to remove the dilution solvent, thereby forming the gel electrolyte layer on the surface of the positive electrode and the negative electrode. Next, the rectangular positive electrode (electrode in which the gel electrolyte layer was formed on both surfaces thereof), the rectangular negative electrode (electrode in which the gel electrolyte layer was formed on both surfaces thereof), and the rectangular separator were laminated in the order of the positive electrode, the separator, the negative electrode, and the separator, thereby forming a laminated electrode body.

Furthermore, the lamination of the positive electrode, separator, and the negative electrode was performed by using a sheet laminating device having a configuration in which an image obtained through photographing with a camera was processed to detect edge positions of four sides of a rectangular member, positioning in a horizontal direction was performed to realize an appropriate clearance between edges of respective four sides of members, and then a lamination operation was performed. In the lamination device, the detection of the edge position was performed with respect to only two adjacent reference sides. In a case where the lamination deviation occurs due to erroneous detection, there is a concern that edges of the positive and negative electrodes which are opposite to the two adjacent reference sides may protrude from the separator, and short-circuit may occur.

Next, the laminated electrode body was packaged with the laminated film including a soft aluminum layer, and a side of the laminated film, from which the positive electrode terminal and the negative electrode terminal were led out, at the periphery of the laminated electrode body, and other three sides of the laminated film were sealed through thermal fusion and were hermetically closed. According to this, a laminated film type battery illustrated in FIG. 4, in which a battery shape had a thickness of 4.5 mm, a width of 30 mm, and a height of 50 mm, was manufactured.

[Evaluation of Battery: Lamination Deviation Short-Circuit Inspection, Measurement of Battery Capacity, and Battery Bending Test]

With respect to the manufactured laminated film type batteries of respective Examples, the lamination deviation short-circuit inspection, the measurement of the battery capacity, and the battery bending test were performed in the same manner as in Example 1-1.

Evaluation results are illustrated in Table 5.

TABLE 5

Electrode Structure: Lamination Type, Laminated Film Battery

| | Gel electrolyte | | | | | Evaluation | | |
|---|---|---|---|---|---|---|---|---|
| | Filler | | | | | Winding | | |
| | Kind of material | Plane rate [%] | Refractive index | Matrix polymer | Application target | External appearance | deviation short-circuit inspection | Battery capacity [mAh] | Battery bending test |
| Example 5-1 | Boehmite | 75 | 1.7 | PVdF | Positive | Transparent | Passing | 1050 | Passing |
| Example 5-2 | Talc | 75 | 1.6 | PVdF | and | Transparent | Passing | 1050 | Passing |

TABLE 5-continued

Electrode Structure: Lamination Type, Laminated Film Battery

| | Gel electrolyte | | | | | Evaluation | | |
|---|---|---|---|---|---|---|---|---|
| | Filler | | | | | Winding | | |
| Kind of material | Plane rate [%] | Refractive index | Matrix polymer | Application target | External appearance | deviation short-circuit inspection | Battery capacity [mAh] | Battery bending test |
| | | | | negative electrodes | | | | |

As illustrated in Table 5, in Example 5-1 and Example 5-2, the gel electrolyte layer contained particles which had a plane rate in a predetermined range, and a refractive index in a predetermined range. Accordingly, the external appearance was transparent, the battery capacity did not deteriorate (equal to or greater than the required capacity of 1000 mAh), the lamination deviation short-circuit inspection and the battery bending test were regarded as "passing", and stability also could be secured.

<Example 6-1 to Example 6-55> and
<Comparative Example 6-1 to Comparative Example 6-10>

The gel electrolyte was formed on both surfaces of the separator instead of forming the gel electrolyte layer on both surfaces of each of the positive electrode and the negative electrode. That is, laminated film type batteries were manufactured in the same manner as in Example 1-1 to Example 1-55, and Comparative Example 1-1 to Comparative Example 1-10 except that the formation of the gel electrolyte layer was changed as follows.

[Formation of Gel Electrolyte Layer]

Lithium hexafluorophosphate ($LiPF_6$) as an electrolyte salt was dissolved in a nonaqueous solvent, in which ethylene carbonate (EC), propylene carbonate (PC), and vinylene carbonate (VC) were mixed in a mass ratio of 49:49:2, in a concentration of 1 mol/$dm^3$, thereby preparing a nonaqueous electrolytic solution.

Subsequently, polyvinylidene fluoride (PVdF) as a matrix polymer compound (resin) for retention of the nonaqueous electrolytic solution was used. The nonaqueous electrolyte solution, the polyvinylidene fluoride, dimethyl carbonate (DMC) as a dilution solvent, and boehmite particles (refractive index: 1.7), which are inorganic particles, as filler were mixed with each other to prepare a sol-like precursor solution.

Furthermore, the precursor solution contained a dilution solvent (DMC) in the same mass as that of the nonaqueous solvent in addition to constituent components (boehmite particles: 10% by mass, a matrix polymer compound (PVdF): 10% by mass, $LiPF_6$: 10% by mass, and a non-aqueous solvent: 70% by mass) of the gel electrolyte. A mass ratio (boehmite particle/$LiPF_6$) between the boehmite particles and $LiPF_6$ was set to 50/50, and a mass ratio (boehmite particle/PVdF) between the boehmite particles and PVdF was set to 50/50.

Subsequently, the precursor solution was applied to both surfaces of the separator, and was dried to remove the dilution solvent (DMC). According to this, a gel electrolyte layer was formed on the surfaces of the separator.

[Assembly of Laminated Film Type Battery]

The positive electrode, the negative electrode, and the separator in which the gel electrolyte layer was formed on both surfaces thereof were laminated in the order of the positive electrode, the separator, the negative electrode, and the separator, and the resultant laminated body was wound a plurality of times in a flat shape along a longitudinal direction thereof by using the same winding device as in Example 1-1. Then, a winding end portion was fixed with an adhesive tape to form a wound electrode body.

Next, the wound electrode body was packaged with a laminated film including a soft aluminum layer, and a side of the laminated film, from which the positive electrode terminal and the negative electrode terminal were led out, at the periphery of the wound electrode body, and other two sides of the laminated film were sealed through thermal fusion at a reduced pressure and were hermetically closed. According to this, a laminated film type battery illustrated in FIG. 1, in which a battery shape had a thickness of 4.5 mm, a width of 30 mm, and a height of 50 mm, was manufactured.

[Evaluation of Battery: Winding Deviation Short-Circuit Inspection, Measurement of Battery Capacity, and Battery Bending Test]

With respect to manufactured laminated film type batteries of respective Examples and Comparative Examples, the winding deviation short-circuit inspection, the measurement of the battery capacity, and the battery bending test were performed in the same manner as in Example 1-1.

Evaluation results are illustrated in Table 6.

TABLE 6

Electrode Structure: Winding Type, Laminated Film Battery

| | Gel electrolyte | | | | | Evaluation | | |
|---|---|---|---|---|---|---|---|---|
| | Filler | | | | | Winding | | |
| | Kind of material | Plane rate [%] | Refractive index | Matrix polymer | Application target | External appearance | deviation short-circuit inspection | Battery capacity [mAh] | Battery bending test |
| Example 6-1 | Boehmite | 75 | 1.7 | PVdF | Both surfaces of separator | Transparent | Passing | 1050 | Passing |
| Example 6-2 | Talc | | 1.6 | | | Transparent | Passing | 1050 | Passing |
| Example 6-3 | Zinc oxide | | 2.0 | | | Transparent | Passing | 1050 | Passing |
| Example 6-4 | Tin oxide | | 2.0 | | | Transparent | Passing | 1050 | Passing |

TABLE 6-continued

Electrode Structure: Winding Type, Laminated Film Battery

| | Gel electrolyte | | | | | | Evaluation | | |
|---|---|---|---|---|---|---|---|---|---|
| | Filler | | | | | | Winding | | |
| | Kind of material | Plane rate [%] | Refractive index | Matrix polymer | Application target | External appearance | deviation short-circuit inspection | Battery capacity [mAh] | Battery bending test |
| Example 6-5 | Silicon oxide | | 1.5 | | | Transparent | Passing | 1050 | Passing |
| Example 6-6 | Magnesium oxide | | 1.7 | | | Transparent | Passing | 1050 | Passing |
| Example 6-7 | Antimony oxide | | 2.1 | | | Transparent | Passing | 1050 | Passing |
| Example 6-8 | Aluminum oxide | | 1.8 | | | Transparent | Passing | 1050 | Passing |
| Example 6-9 | Magnesium sulfate | | 1.5 | | | Transparent | Passing | 1050 | Passing |
| Example 6-10 | Calcium sulfate | | 1.6 | | | Transparent | Passing | 1050 | Passing |
| Example 6-11 | Barium sulfate | | 1.6 | | | Transparent | Passing | 1050 | Passing |
| Example 6-12 | Strontium sulfate | | 1.5 | | | Transparent | Passing | 1050 | Passing |
| Example 6-13 | Magnesium carbonate | | 1.5 | | | Transparent | Passing | 1050 | Passing |
| Example 6-14 | Calcium carbonate | | 1.6 | | | Transparent | Passing | 1050 | Passing |
| Example 6-15 | Barium carbonate | | 1.6 | | | Transparent | Passing | 1050 | Passing |
| Example 6-16 | Lithium carbonate | | 1.5 | | | Transparent | Passing | 1050 | Passing |
| Example 6-17 | Magnesium hydroxide | | 1.6 | | | Transparent | Passing | 1050 | Passing |
| Example 6-18 | Aluminum hydroxide | | 1.3 | | | Transparent | Passing | 1050 | Passing |
| Example 6-19 | Zinc hydroxide | 75 | 1.5 | PVdF | Both | Transparent | Passing | 1050 | Passing |
| Example 6-20 | Boron carbide | | 1.5 | | surfaces | Transparent | Passing | 1050 | Passing |
| Example 6-21 | Silicon nitride | | 2.0 | | of | Transparent | Passing | 1050 | Passing |
| Example 6-22 | Boron nitride | | 2.1 | | separator | Transparent | Passing | 1050 | Passing |
| Example 6-23 | Aluminum nitride and the like | | 2.1 | | | Transparent | Passing | 1050 | Passing |
| Example 6-24 | Titanium nitride | | 1.3 | | | Transparent | Passing | 1050 | Passing |
| Example 6-25 | Lithium fluoride | | 1.4 | | | Transparent | Passing | 1050 | Passing |
| Example 6-26 | Aluminum fluoride | | 1.3 | | | Transparent | Passing | 1050 | Passing |
| Example 6-27 | Calcium fluoride | | 1.4 | | | Transparent | Passing | 1050 | Passing |
| Example 6-28 | Barium fluoride | | 1.5 | | | Transparent | Passing | 1050 | Passing |
| Example 6-29 | Magnesium fluoride | | 1.4 | | | Transparent | Passing | 1050 | Passing |
| Example 6-30 | Trilithium phosphate | | 1.5 | | | Transparent | Passing | 1050 | Passing |
| Example 6-31 | Magnesium phosphate | | 1.5 | | | Transparent | Passing | 1050 | Passing |
| Example 6-32 | Magnesium hydrogenphosphate | | 1.5 | | | Transparent | Passing | 1050 | Passing |
| Example 6-33 | Calcium silicate | | 1.6 | | | Transparent | Passing | 1050 | Passing |
| Example 6-34 | Zinc silicate | | 1.6 | | | Transparent | Passing | 1050 | Passing |
| Example 6-35 | Zirconium silicate | | 2.0 | | | Transparent | Passing | 1050 | Passing |
| Example 6-36 | Aluminum silicate | | 1.7 | | | Transparent | Passing | 1050 | Passing |
| Example 6-37 | Magnesium Silicate | | 1.6 | | | Transparent | Passing | 1050 | Passing |
| Example 6-38 | Spinel | | 1.7 | | | Transparent | Passing | 1050 | Passing |
| Example 6-39 | Hydrotalcite | | 1.5 | | | Transparent | Passing | 1050 | Passing |
| Example 6-40 | Dolomite | | 1.6 | | | Transparent | Passing | 1050 | Passing |
| Example 6-41 | Kaolinite | | 1.6 | | | Transparent | Passing | 1050 | Passing |
| Example 6-42 | Sepiolite | | 1.5 | | | Transparent | Passing | 1050 | Passing |
| Example 6-43 | Imogolite | | 1.5 | | | Transparent | Passing | 1050 | Passing |
| Example 6-44 | Sericite | | 1.6 | | | Transparent | Passing | 1050 | Passing |
| Example 6-45 | Pyrophyllite | | 1.6 | | | Transparent | Passing | 1050 | Passing |
| Example 6-46 | Mica | | 1.6 | | | Transparent | Passing | 1050 | Passing |
| Example 6-47 | Zeolite | | 1.5 | | | Transparent | Passing | 1050 | Passing |
| Example 6-48 | Mullite | | 1.5 | | | Transparent | Passing | 1050 | Passing |
| Example 6-49 | Saponite | | 1.5 | | | Transparent | Passing | 1050 | Passing |
| Example 6-50 | Attapulgite | | 1.5 | | | Transparent | Passing | 1050 | Passing |
| Example 6-51 | Montmorillonite | | 1.5 | | | Transparent | Passing | 1050 | Passing |
| Example 6-52 | Melamine | | 1.6 | | | Transparent | Passing | 1050 | Passing |
| Example 6-53 | Ammonium polyphosphate | | 1.6 | | | Transparent | Passing | 1050 | Passing |
| Example 6-54 | Melamine cyanurate | | 1.6 | | | Transparent | Passing | 1050 | Passing |
| Example 6-55 | Melamine polyphosphate | | 1.6 | | | Transparent | Passing | 1050 | Passing |
| Comparative Example 6-1 | — | 75 | — | PVdF | Both surfaces | Transparent | Passing | 1050 | Failing |
| Comparative Example 6-2 | Zirconium oxide | | 2.4 | | of separator | Dark white turbidity | Failing | Test was impossible | Test was impossible |

TABLE 6-continued

Electrode Structure: Winding Type, Laminated Film Battery

| | Gel electrolyte | | | | | Evaluation | | |
|---|---|---|---|---|---|---|---|---|
| | Filler | | | | | Winding | | |
| | Kind of material | Plane rate [%] | Refractive index | Matrix polymer | Application target | External appearance | deviation short-circuit inspection | Battery capacity [mAh] | Battery bending test |
| Comparative Example 6-3 | Cerium oxide | | 2.2 | | | Dark white turbidity | Failing | Test was impossible | Test was impossible |
| Comparative Example 6-4 | Barium titanate | | 2.4 | | | Dark white turbidity | Failing | Test was impossible | Test was impossible |
| Comparative Example 6-5 | Strontium titanate | | 2.4 | | | Dark white turbidity | Failing | Test was impossible | Test was impossible |
| Comparative Example 6-6 | Titanium oxide | | 2.6 | | | Dark white turbidity | Failing | Test was impossible | Test was impossible |
| Comparative Example 6-7 | Diamond | | 2.4 | | | Dark white turbidity | Failing | Test was impossible | Test was impossible |
| Comparative Example 6-8 | Silicon carbide (colored particles) | | — | | | Brown opacity | Failing | Test was impossible | Test was impossible |
| Comparative Example 6-9 | Iron oxide (colored particles) | | — | | | Brown opacity | Failing | Test was impossible | Test was impossible |
| Comparative Example 6-10 | Silicon (colored particles) | | — | | | Brown opacity | Failing | Test was impossible | Test was impossible |

As illustrated in Table 6, in Example 6-1 to Example 6-55, the gel electrolyte contained particles which had a plane rate in a predetermined range, and a refractive index in a predetermined range. Accordingly, the external appearance was transparent, the battery capacity did not deteriorate (equal to or greater than the required capacity of 1000 mAh), the winding deviation short-circuit inspection and the battery bending test were regarded as "passing", and stability also could be secured. On the other hand, in Comparative Example 6-1, the gel electrolyte did not contain the particles, and thus strength was deficient, and the battery bending test was regarded as "failing". In Comparative Example 6-2 to Comparative Example 6-10, the gel electrolyte contained particles which did not have at least any one of the plane rate in a predetermined range, and the refractive index in a predetermined range. Therefore, the gel electrolyte was not transparent, and the winding deviation short-circuit inspection and the battery bending test were regarded as "failing". In addition, short-circuit occurred, and thus the battery capacity test was impossible (measurement was impossible).

Example 7-1

A laminated film type batter was manufactured in the same manner as in Example 6-1.

Example 7-2 to Example 7-7

As the filler, boehmite particles having a different plane rate were used. The plane rate of the boehmite particles was adjusted to a desired value as follows. A growth rate during hydrothermal synthesis of the boehmite particles was raised to increase the proportion of a spherical surface, or the growth rate was lowered to increase the plane rate. Specifically, in Example 7-2, boehmite particles having a plane rate of 45% were used as the filler. In Example 7-3, boehmite particles having a plane rate of 50% were used as the filler. In Example 7-4, boehmite particles having a plane rate of 60% were used as the filler. In Example 7-5, boehmite particles having a plane rate of 80% were used as the filler. In Example 7-6, boehmite particles having a plane rate of 90% were used as the filler. In Example 7-7, boehmite particles having a plane rate of 100% were used as the filler. Laminated film type batteries were manufactured in the same manner as in Example 7-1 except for the above-described configurations.

Example 7-8

A laminated film type battery was manufactured in the same manner as in Example 6-2.

Example 7-9 to Example 7-14

As the filler, talc particles having a different plane rate were used. Furthermore, in a pulverization process that was performed by using a hammer mill and a roll mill, the plane rate of the talc particles was adjusted to a desired value as follows. The time proportion of the hammer mill was raised to increase the proportion of the cleavage plane, or the time proportion of the roll mill was raised to decrease the proportion of the cleavage plane.

Specifically, in Example 7-9, talc particles having a plane rate of 45% were used as the filler. In Example 7-10, talc particles having a plane rate of 50% were used as the filler. In Example 7-11, talc particles having a plane rate of 60% were used as the filler. In Example 7-12, talc particles having a plane rate of 80% were used as the filler. In Example 7-13, talc particles having a plane rate of 90% were used as the filler. In Example 7-14, talc particles having a plane rate of 100% were used as the filler. Laminated film type batteries were manufactured in the same manner as in Example 7-8 except for the above-described configurations.

Comparative Example 7-1 to Comparative Example 7-5

Instead of the boehmite particles, aluminum oxide particles having a different plane rate were used as the filler. Specifically, in Comparative Example 7-1, aluminum oxide particles having a plane rate of 40% were used as the filler. In Comparative Example 7-2, aluminum oxide particles having a plane rate of 30% were used as the filler. In Comparative Example 7-3, aluminum oxide particles having a plane rate of 20% were used as the filler. In Comparative Example 7-4, aluminum oxide particles having a plane rate of 10% were used as the filler. In Comparative Example 7-5, aluminum oxide particles (plane rate: 0%) having a spherical shape were used as the filler. Laminated film type batteries were manufactured in the same manner as in Example 7-1 except for the above-described configurations.

Comparative Example 7-6

As the positive electrode, an electrode, of which a positive electrode width was made to be narrower than a positive electrode width of Example 7-1 by 10%, was used. A laminated film type battery was manufactured in the same manner as in Comparative Example 7-5 except for the above-described configuration.

[Evaluation of Battery: Winding Deviation Short-Circuit Inspection, Measurement of Battery Capacity, and Battery Bending Test]

With respect to the manufactured laminated film type batteries of respective Examples and Comparative Examples, the winding deviation short-circuit inspection, the measurement of the battery capacity, and the battery bending test were performed in the same manner as in Example 1-1.

Evaluation results are illustrated in Table 7.

As illustrated in Table 7, in Example 7-1 to Example 7-14, the gel electrolyte layer contained particles which had a plane rate in a predetermined range, and a refractive index in a predetermined range. Accordingly, the external appearance was transparent, the battery capacity did not deteriorate (equal to or greater than the required capacity of 1000 mAh), the winding deviation short-circuit inspection and the battery bending test were regarded as "passing", and stability also could be secured. On the other hand, in Comparative Example 7-1 to Comparative Example 7-5, the gel electrolyte layer contained particles which did not have at least any one of the plane rate in a predetermined range, and the refractive index in a predetermined range. Therefore, the gel electrolyte layer was not transparent, and the winding deviation short-circuit inspection and the battery bending test were regarded as "failing". In addition, short-circuit occurred, and thus the battery capacity test was impossible (measurement was impossible). Furthermore, in Comparative Example 7-6, as is the case with the related art, the positive electrode width was made to be narrower than the positive electrode width of Comparative Example 7-5 by 10%, and thus the winding deviation was great. However, the clearance between respective edges of the positive electrode, the negative electrode, and the separator was also great, and thus short-circuit did not occur. However, the battery capacity did not reach the required capacity of 1000 mAh.

TABLE 7

Electrode Structure: Winding Type, Laminated Film Battery

| | Gel electrolyte | | | | | Evaluation | | |
|---|---|---|---|---|---|---|---|---|
| | Filler | | | | | Winding | | |
| | Kind of material | Plane rate [%] | Refractive index | Matrix polymer | Application target | External appearance | deviation short-circuit inspection | Battery capacity [mAh] | Battery bending test |
| Example 7-1 | Boehmite | 75 | 1.7 | PVdF | Both surfaces of separator | Transparent | Passing | 1050 | Passing |
| Example 7-2 | | 45 | 1.7 | | | Close to transparent | Passing | 1050 | Passing |
| Example 7-3 | | 50 | 1.7 | | | Almost transparent | Passing | 1050 | Passing |
| Example 7-4 | | 60 | 1.7 | | | Transparent | Passing | 1050 | Passing |
| Example 7-5 | | 80 | 1.7 | | | Transparent | Passing | 1050 | Passing |
| Example 7-6 | | 90 | 1.7 | | | Transparent | Passing | 1050 | Passing |
| Example 7-7 | | 100 | 1.7 | | | Transparent | Passing | 1050 | Passing |
| Example 7-8 | Talc | 75 | 1.6 | PVdF | Both surfaces of separator | Transparent | Passing | 1050 | Passing |
| Example 7-9 | | 45 | 1.6 | | | Close to transparent | Passing | 1050 | Passing |
| Example 7-10 | | 50 | 1.6 | | | Almost transparent | Passing | 1050 | Passing |
| Example 7-11 | | 60 | 1.6 | | | Transparent | Passing | 1050 | Passing |
| Example 7-12 | | 80 | 1.6 | | | Transparent | Passing | 1050 | Passing |
| Example 7-13 | | 90 | 1.6 | | | Transparent | Passing | 1050 | Passing |
| Example 7-14 | | 100 | 1.6 | | | Transparent | Passing | 1050 | Passing |
| Comparative Example 7-1 | Aluminum oxide | 40 | 1.8 | PVdF | Both surfaces of separator | Translucent | Failing | Test was impossible | Test was impossible |
| Comparative Example 7-2 | | 30 | 1.8 | | | Light white turbidity | Failing | Test was impossible | Test was impossible |
| Comparative Example 7-3 | | 20 | 1.8 | | | White turbidity | Failing | Test was impossible | Test was impossible |
| Comparative Example 7-4 | | 10 | 1.8 | | | Dark white turbidity | Failing | Test was impossible | Test was impossible |
| Comparative Example 7-5 | | 0 (Spherical body) | 1.8 | | | Dark white turbidity | Failing | Test was impossible | Test was impossible |
| Comparative Example 7-6 | | 0 (Spherical body) | 1.8 | | *1 | Dark white turbidity | Passing | 950 | Passing |

*1: Positive and negative electrodes (a positive electrode width and a negative electrode width were made to be narrower by 10%)

Example 8-1 to Example 8-8

In Example 8-1 to Example 8-8, laminated film type batteries were manufactured in the same manner as in Example 6-1 except that the amount of each of the components including the filler (boehmite particles), the matrix polymer (PVdF), LiPF$_6$, and the solvent, which are constituent components of the gel electrolyte, was changed as illustrated in the following Table 8.

Example 8-9 to Example 8-15

In Example 8-9 to Example 8-15, laminated film type batteries were manufactured in the same manner as in Example 6-2 except that the amount of each of the components including the filler (talc particles), the matrix polymer (PVdF), LiPF$_6$, and the solvent, which are constituent components of the gel electrolyte, was changed as illustrated in the following Table 8.

[Evaluation of Battery: Winding Deviation Short-Circuit Inspection, Measurement of Battery Capacity, and Battery Bending Test]

With respect to the manufactured laminated film type batteries of respective Examples, the winding deviation short-circuit inspection, the measurement of the battery capacity, and the battery bending test were performed in the same manner as in Example 1-1.

Evaluation results are illustrated in Table 8.

TABLE 8

Electrode Structure: Winding Type, Laminated Film Battery

| | Gel electrolyte | | | | | | | |
|---|---|---|---|---|---|---|---|---|
| | Filler | | | Particles [% by mass] | PVdF [% by mass] | LiPF$_6$ [% by mass] | Solvent [% by mass] | Mass ratio Particle/PVdF |
| | Kind of material | Plane rate [%] | Refractive index | | | | | |
| Example 8-1 | Boehmite | 75 | 1.7 | 5.2 | 29.3 | 29.3 | 36.2 | 15/85 |
| Example 8-2 | | | | 7.7 | 30.8 | 7.7 | 53.8 | 20/80 |
| Example 8-3 | | | | 8.8 | 20.6 | 8.8 | 61.8 | 30/70 |
| Example 8-4 | | | | 10.0 | 10.0 | 10.0 | 70.0 | 50/50 |
| Example 8-5 | | | | 20.6 | 8.8 | 8.8 | 61.8 | 70/30 |
| Example 8-6 | | | | 30.8 | 7.7 | 7.7 | 53.8 | 80/20 |
| Example 8-7 | | | | 38.7 | 6.8 | 6.8 | 47.7 | 85/15 |
| Example 8-8 | | | | 50.0 | 5.6 | 5.6 | 38.9 | 90/10 |
| Example 8-9 | Talc | 75 | 1.6 | 7.7 | 7.7 | 30.8 | 53.8 | 50/50 |
| Example 8-10 | | | | 8.8 | 8.8 | 20.6 | 61.8 | 50/50 |
| Example 8-11 | | | | 10.0 | 10.0 | 10.0 | 70.0 | 50/50 |
| Example 8-12 | | | | 20.6 | 8.8 | 8.8 | 61.8 | 70/30 |
| Example 8-13 | | | | 30.8 | 7.7 | 7.7 | 53.8 | 80/20 |
| Example 8-14 | | | | 38.7 | 6.8 | 6.8 | 47.7 | 85/15 |
| Example 8-15 | | | | 50.0 | 5.6 | 5.6 | 38.9 | 90/10 |

| | Gel electrolyte | | | Evaluation | | |
|---|---|---|---|---|---|---|
| | Mass ratio Particle/LiPF$_6$ | Application target | External appearance | Winding deviation short-circuit inspection | Battery capacity [mAh] | Battery bending test |
| Example 8-1 | 15/85 | Both surface of separator | Transparent | Passing | 1050 | Passing |
| Example 8-2 | 50/50 | | Transparent | Passing | 1050 | Passing |
| Example 8-3 | 50/50 | | Transparent | Passing | 1050 | Passing |
| Example 8-4 | 50/50 | | Transparent | Passing | 1050 | Passing |
| Example 8-5 | 70/30 | | Transparent | Passing | 1050 | Passing |
| Example 8-6 | 80/20 | | Transparent | Passing | 1050 | Passing |
| Example 8-7 | 85/15 | | Almost transparent | Passing | 1050 | Passing |
| Example 8-8 | 90/10 | | Close to transparent | Passing | 1050 | Passing |
| Example 8-9 | 20/80 | Both surface of separator | Transparent | Passing | 1050 | Passing |
| Example 8-10 | 30/70 | | Transparent | Passing | 1050 | Passing |
| Example 8-11 | 50/50 | | Transparent | Passing | 1050 | Passing |
| Example 8-12 | 70/30 | | Transparent | Passing | 1050 | Passing |
| Example 8-13 | 80/20 | | Transparent | Passing | 1050 | Passing |
| Example 8-14 | 85/15 | | Almost transparent | Passing | 1050 | Passing |
| Example 8-15 | 90/10 | | Close to transparent | Passing | 1050 | Passing |

As illustrated in Table 8, in Example 8-1 to Example 8-15, the gel electrolyte contained particles which had a plane rate in a predetermined range, and a refractive index in a predetermined range. Accordingly, the external appearance was transparent, the battery capacity did not deteriorate (equal to or greater than the required capacity of 1000 mAh), the winding deviation short-circuit inspection and the battery bending test were regarded as "passing", and stability also could be secured. In addition, it was confirmed that the degree of transparency could be changed by changing the ratio (mixing ratio) between the particles and the matrix polymer compound, and/or the ratio (mixing ratio) between the particles and the electrolyte salt.

Example 9-1

In Example 9-1, a laminated film type battery was manufactured in the same manner as in Example 6-1.

Example 9-2 and Example 9-3

In Example 9-2 and Example 9-3, the kind of the matrix polymer (resin), which constitutes the gel electrolyte layer, was changed. In Example 9-2, polyacrylonitrile (PAN) was used as the matrix polymer. In Example 9-3, polyethylene glycol (PEG) was used as the matrix polymer. Laminated film type batteries were manufactured in the same manner as in Example 9-1 except for the above-described configurations.

Example 9-4

In Example 9-4, a laminated film type battery was manufactured in the same manner as in Example 9-2.

Example 9-5 and Example 9-6

In Example 9-5 and Example 9-6, the kind of the matrix polymer, which constitutes the gel electrolyte layer, was changed. In Example 9-5, polyacrylonitrile (PAN) was used as the matrix polymer. In Example 9-6, polyethylene glycol (PEG) was used as the matrix polymer. Laminated film type batteries were manufactured in the same manner as in Example 9-4 except for the above-described configurations.

[Evaluation of Battery: Winding Deviation Short-Circuit Inspection, Measurement of Battery Capacity, and Battery Bending Test]

With respect to the manufactured laminated film type batteries of respective Examples, the winding deviation short-circuit inspection, the measurement of the battery capacity, and the battery bending test were performed in the same manner as in Example 1-1.

Evaluation results are illustrated in Table 9.

TABLE 9

| | Electrode Structure: Winding Type, Laminated Film Battery | | | | | | | |
|---|---|---|---|---|---|---|---|---|
| | Gel electrolyte | | | | | Evaluation | | |
| | Filler | | | | | Winding | | |
| | Kind of material | Plane rate [%] | Refractive index | Matrix polymer | Application target | External appearance | deviation short-circuit inspection | Battery capacity [mAh] | Battery bending test |
| Example 9-1 | Boehmite | 75 | 1.7 | PVdF | Both surface of separator | Transparent | Passing | 1050 | Passing |
| Example 9-2 | | | | PAN | | Transparent | Passing | 1050 | Passing |
| Example 9-3 | | | | PEG | | Transparent | Passing | 1050 | Passing |
| Example 9-4 | Talc | 75 | 1.6 | PVdF | Both surface of separator | Transparent | Passing | 1050 | Passing |
| Example 9-5 | | | | PAN | | Transparent | Passing | 1050 | Passing |
| Example 9-6 | | | | PEG | | Transparent | Passing | 1050 | Passing |

As illustrated in Table 9, in Example 9-1 to Example 9-6, the gel electrolyte layer contained particles which had a plane rate in a predetermined range, and a refractive index in a predetermined range. Accordingly, the external appearance was transparent, the battery capacity did not deteriorate (equal to or greater than the required capacity of 1000 mAh), the winding deviation short-circuit inspection and the battery bending test were regarded as "passing", and stability also could be secured.

Example 10-1 and Example 10-2

In Example 10-1 and Example 10-2, the configuration of each of the positive electrode, the negative electrode, the separator, and the gel electrolyte layer was the same as in each of Example 6-1 and Example 6-2, and laminated film type batteries, in which the laminated electrolyte body was packaged with a laminated film, were manufactured.

[Assembly of Laminated Film Type Battery]

The same precursor solution as in Example 6-1 or Example 6-2 was applied to both surfaces of the rectangular separator and was dried to remove the dilution solvent, thereby forming a gel electrolyte layer on the both surfaces of the separator. Next, the rectangular positive electrode, the rectangular negative electrode, and the rectangular separator (separator in which the gel electrolyte layer was formed on both surfaces thereof) were laminated in the order of the positive electrode, the separator (separator in which the gel electrolyte layer was formed on both surfaces thereof), the negative electrode, and the separator (separator in which the gel electrolyte layer was formed on both surfaces thereof), thereby forming a laminated electrode body. Further, the lamination of the positive electrode, the separator, and the negative electrode was performed by using the same sheet laminating device as in Example 6-1.

Next, the laminated electrode body was packaged with the laminated film including a soft aluminum layer, and a side of the laminated film, from which the positive electrode terminal and the negative electrode terminal were led out, at the periphery of the laminated electrode body, and other three sides of the laminated film were sealed through thermal fusion and were hermetically closed. According to this, a laminated film type battery illustrated in FIG. 4, in which a battery shape had a thickness of 4.5 mm, a width of 30 mm, and a height of 50 mm, was manufactured.

[Evaluation of Battery: Lamination Deviation Short-Circuit Inspection, Measurement of Battery Capacity, and Battery Bending Test]

With respect to the manufactured laminated film type batteries of respective Examples, the lamination deviation short-circuit inspection, the measurement of the battery capacity, and the battery bending test were performed in the same manner as in Example 1-1.

Evaluation results are illustrated in Table 10.

TABLE 10

Electrode Structure: Lamination Type, Laminated Film Battery

| | Gel electrolyte | | | | | Evaluation | | |
|---|---|---|---|---|---|---|---|---|
| | Filler | | | | | Winding | | |
| | Kind of material | Plane rate [%] | Refractive index | Matrix polymer | Application target | External appearance | deviation short-circuit inspection | Battery capacity [mAh] | Battery bending test |
| Example 10-1 | Boehmite | 75 | 1.7 | PVdF | Both surface of separator | Transparent | Passing | 1050 | Passing |
| Example 10-2 | Talc | 75 | 1.6 | PVdF | Both surface of separator | Transparent | Passing | 1050 | Passing |

As illustrated in Table 10, in Example 10-1 and Example 10-2, the gel electrolyte layer contained particles which had a plane rate in a predetermined range, and a refractive index in a predetermined range. Accordingly, the external appearance was transparent, the battery capacity did not deteriorate (equal to or greater than the required capacity of 1000 mAh), the winding deviation short-circuit inspection and the battery bending test were regarded as "passing", and stability also could be secured.

5. Other Embodiments

Hereinbefore, the present technology has been described with reference to the respective embodiments and examples. However, the present technology is not limited thereto, and various modifications can be made in a range of the gist of the present technology.

For example, the dimensions, the structures, the shapes, the materials, the raw materials, the manufacturing processes, and the like, which are exemplified in the above-described embodiments and examples, are illustrative only, and other dimensions, structures, shapes, materials, raw materials, manufacturing processes, and the like, which are different from those which are exemplified, may be used as necessary.

In addition, the configurations, the methods, the processes, the shapes, the materials, the dimensions, and the like of the above-described embodiments and examples may be combined with each other in a range not departing from the gist of the present technology. For example, the non-aqueous electrolyte battery may be a primary battery.

In addition, the electrolyte layer of the present technology may also be applied to a case with other battery structures such as a cylindrical type, a coin type, a square type, and a button type.

Furthermore, the present technology may employ the following configurations.

[1]
A battery, including:
a positive electrode;
a negative electrode;
a separator; and
an electrolyte that contains particles, a resin, and an electrolytic solution,
wherein a shape of the particles includes a plane, a plane rate of the particles is greater than 40% and equal to or less than 100%, and a refractive index of the particles is equal to or greater than 1.3 and less than 2.4.

[2]
The battery according to [1],
wherein the electrolyte is transparent.

[3]
The battery according to [1] or [2],
wherein the plane includes at least any one of a crystal plane, a broken plane, and a cleavage plane.

[4]
The battery according to any one of [1] to [3],
wherein the particles are at least one kind of inorganic particles and organic particles.

[5]
The battery according to [4],
wherein the inorganic particles are at least one kind of particles selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, trilithium phosphate, magnesium phosphate, magnesium hydrogen phosphate, ammonium polyphosphate, a silicate mineral, a carbonate mineral, and an oxide mineral, and
the organic particles are at least one kind of particles selected from the group consisting of melamine, melamine cyanurate, melamine polyphosphate, crosslinked polymethyl methacrylate, polyethylene, polypropylene, polystyrene, polytetrafluoroethylene, polyvinylidene fluoride, polyamide, polyimide, a melamine resin, a phenol resin, and an epoxy resin.

[6]

The battery according to [5], wherein the silicate mineral is at least one kind selected from the group consisting of talc, calcium silicate, zinc silicate, zirconium silicate, aluminum silicate, magnesium silicate, kaolinite, sepiolite, imogolite, sericite, pyrophyllite, mica, zeolite, mullite, saponite, attapulgite, and montmorillonite, the carbonate mineral is at least one kind selected from the group consisting of hydrotalcite and dolomite, and the oxide mineral is spinel.

[7]

The battery according to any one of [1] to [6], wherein the resin is at least one kind selected from the group consisting of polyvinylidene fluoride, polytetrafluoroethylene, a vinylidene fluoride-tetrafluoroethylene copolymer, an ethylene-tetrafluoroethylene copolymer, a vinylidene fluoride-tetrafluoroethylene copolymer, an ethylene-tetrafluoroethylene copolymer, a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, a acrylonitrile-acrylic acid ester copolymer, an ethylene propylene rubber, polyvinyl alcohol, polyvinyl acetate, ethyl cellulose, a cellulose derivative, polyphenylene ether, polysulfone, polyether sulfone, polyphenylene sulfide, polyetherimide, polyimide, polyamide, polyamideimide, polyacrylonitrile, polyvinyl alcohol, polyether, an acrylic acid resin, polyester, and polyethylene glycol.

[8]

The battery according to any one of [1] to [7], wherein the electrolytic solution contains an electrolyte salt, and a nonaqueous solvent in which the electrolyte salt is dissolved, and at least one of amass ratio (particle/resin) between the particles and the resin, and a mass ratio (particle/electrolyte salt) between the particles and the electrolyte salt is 15/85 to 90/10.

[9]

The battery according to any one of [1] to [8] wherein the amount of particles contained is 5.6% by mass to 50.0% by mass on the basis of the mass of the electrolyte.

[10]

The battery according to any one of [1] to [9], wherein the amount of the resin contained is 5.6% by mass to 30.8% by mass on the basis of the mass of the electrolyte.

[11]

The battery according to any one of [1] to [10], wherein the electrolytic solution contains an electrolyte salt and a nonaqueous solvent in which the electrolyte salt is dissolved, and the amount of the electrolyte salt contained is 5.6% by mass to 30.8% by mass on the basis of the mass of the electrolyte.

[12]

The battery according to any one of [1] to [11], wherein the electrolyte is a gel-like electrolyte in which the electrolytic solution is retained by the resin.

[13]

The battery according to any one of [1] to [12], including:

an electrode body in which the electrolyte is formed on both surfaces of at least one electrode of the positive electrode and the negative electrode, or on at least one surface of both surfaces of the separator, and which is formed by laminating, or laminating and winding the positive electrode, the negative electrode, and the separator.

[14]

An electrolyte, containing:

particles;

a resin; and an electrolytic solution, wherein a shape of the particles includes a plane, a plane rate of the particles is greater than 40% and equal to or less than 100%, and a refractive index of the particles is equal to or greater than 1.3 and less than 2.4.

[15]

A battery pack, including:

the battery according to any one of [1] to [13];

a control unit that controls the battery; and an exterior package that accommodates the battery on an inner side.

[16]

An electronic apparatus, including:

the battery according to any one of [1] to [13], wherein electric power is supplied from the battery.

[17]

An electrically driven vehicle, including:

the battery according to any one of [1] to [13];

a conversion device to which electric power is supplied from the battery and which converts the electric power to a driving force of a vehicle; and a control device that performs an information processing related to vehicle control on the basis of information about the battery.

[18]

An electrical storage device, including:

the battery according to any one of [1] to [13], wherein the electrical storage device supplies electric power to an electronic apparatus that is connected to the battery.

[19]

The electrical storage device according to [18], further including:

an electric power information control device that transmits and receives a signal to and from other apparatuses via a network, wherein charge and discharge control of the battery is performed on the basis of information that is received by the electric power information control device.

[20]

An electric power system, wherein electric power is supplied from the battery according to any one of [1] to [13], or the electric power is supplied to the battery from a power generator or a power network.

REFERENCE SIGNS LIST

50 Wound electrode body
51 Positive electrode lead
52 Negative Electrode lead
53 Positive electrode
53A Positive electrode current collector
53B Positive electrode active material layer
54 Negative electrode
54A Negative electrode current collector
54B Negative electrode active material layer
55 Separator
56 Gel electrolyte layer
57 Protective tape 60 Exterior packaging member
61 Adhesion film
70 Laminated electrode body
71 Positive electrode lead
72 Negative electrode lead
73 Positive electrode
74 Negative electrode
75 Separator
76 Fixing member
101 Battery cell
101a Terrace portion
102a, 102b Lead
103a to 103c Insulating tape
104 Insulating plate
105 Circuit substrate
106 Connector
301 Assembled battery
301a Secondary battery
302a Charge control switch
302b Diode
303a Discharge control switch
303b Diode
304 Switch unit
307 Current detection resistor
308 Temperature detection element
310 Control unit
311 Voltage detection unit
313 Current measurement unit
314 Switch control unit
317 Memory
318 Temperature detection unit
321 Positive electrode terminal
322 Negative electrode terminal
400 Electrical storage system
401 House
402 Centralized power system
402a Thermal power generation
402b Nuclear power generation
402c Hydraulic power generation
403 Electrical storage device
404 Power generator
405 Power-consuming device
405a Refrigerator
405b Air-conditioner
405c Television receiver
405d Bath
406 Electrically driven vehicle
406a Electric vehicle
406b Hybrid car
406c Electric bike
407 Smart meter
408 Power hub
409 Power network
410 Control device
411 Sensor
412 Information network
413 Server
500 Hybrid vehicle
501 Engine
502 Generator
503 Power-driving force converting device
504a Driving wheel
504b Driving wheel
505a Wheel
505b Wheel
508 Battery
509 Vehicle control device
510 Sensor
511 Charging inlet

The invention claimed is:

1. A battery, comprising:
a positive electrode;
a negative electrode;
a separator; and
an electrolyte that contains particles, a resin, and an electrolytic solution,
wherein:
a shape of the particles includes a plane,
a plane rate of the particles is greater than 40% and equal to or less than 100%, and
a refractive index of the particles is equal to or greater than 1.3 and less than 2.4.

2. The battery according to claim 1,
wherein the plane includes at least one of a crystal plane, a broken plane, or a cleavage plane.

3. The battery according to claim 1,
wherein the particles are at least one of inorganic particles or organic particles.

4. The battery according to claim 3, wherein:
the inorganic particles are at least one of particles selected from the group consisting of silicon oxide, zinc oxide, tin oxide, magnesium oxide, antimony oxide, aluminum oxide, magnesium sulfate, calcium sulfate, barium sulfate, strontium sulfate, magnesium carbonate, calcium carbonate, barium carbonate, lithium carbonate, magnesium hydroxide, aluminum hydroxide, zinc hydroxide, boehmite, white carbon, zirconium oxide hydrate, magnesium oxide hydrate, magnesium hydroxide octahydrate, boron carbide, silicon nitride, boron nitride, aluminum nitride, titanium nitride, lithium fluoride, aluminum fluoride, calcium fluoride, barium fluoride, magnesium fluoride, tri-lithium phosphate, magnesium phosphate, magnesium hydrogen phosphate, ammonium polyphosphate, a silicate mineral, a carbonate mineral, and an oxide mineral, and
the organic particles are at least one of particles selected from the group consisting of melamine, melamine cyanurate, melamine polyphosphate, crosslinked polymethyl methacrylate, polyethylene, polypropylene, polystyrene, polytetrafluoroethylene, polyvinylidene fluoride, polyamide, polyimide, a melamine resin, a phenol resin, and an epoxy resin.

5. The battery according to claim 4, wherein:
the silicate mineral is at least one selected from the group consisting of talc, calcium silicate, zinc silicate, zirconium silicate, aluminum silicate, magnesium silicate, kaolinite, sepiolite, imogolite, sericite, pyrophyllite, mica, zeolite, mullite, saponite, attapulgite, and montmorillonite,
the carbonate mineral is at least one selected from the group consisting of hydrotalcite and dolomite, and
the oxide mineral is spinel.

6. The battery according to claim 1,
wherein the resin is at least one selected from the group consisting of polyvinylidene fluoride, polytetrafluoroethylene, a vinylidene fluoride-tetrafluoroethylene copolymer, an ethylene-tetrafluoroethylene copolymer, a vinylidene fluoride-tetrafluoroethylene copolymer, an ethylene-tetrafluoroethylene copolymer, a styrene-butadiene copolymer and a hydride thereof, an acrylonitrile-butadiene copolymer and a hydride thereof, an acrylonitrile-butadiene-styrene copolymer and a hydride thereof, a methacrylic acid ester-acrylic acid ester copolymer, a styrene-acrylic acid ester copolymer, a acrylonitrile-acrylic acid ester copolymer, an ethylene propylene rubber, polyvinyl alcohol, polyvinyl acetate, ethyl cellulose, a cellulose derivative, polyphenylene ether, polysulfone, polyether sulfone, polyphenylene sulfide, polyetherimide, polyimide, polyamide, polyamideimide, polyacrylonitrile, polyvinyl alcohol, polyether, an acrylic acid resin, polyester, and polyethylene glycol.

7. The battery according to claim 1, wherein:
the electrolytic solution contains an electrolyte salt, and a nonaqueous solvent in which the electrolyte salt is dissolved, and
at least one of a mass ratio (particle/resin) between the particles and the resin, and a mass ratio (particle/electrolyte salt) between the particles and the electrolyte salt is in a range of 15/85 to 90/10.

8. The battery according to claim 1,
wherein an amount of the particles contained is in a range of 5.6% by mass to 50.0% by mass based on a mass of the electrolyte.

9. The battery according to claim 1,
wherein an amount of the resin contained is in a range of 5.6% by mass to 30.8% by mass based on a mass of the electrolyte.

10. The battery according to claim 1, wherein:
the electrolytic solution contains an electrolyte salt and a nonaqueous solvent in which the electrolyte salt is dissolved, and
an amount of the electrolyte salt contained is in a range of 5.6% by mass to 30.8% by mass based on a mass of the electrolyte.

11. The battery according to claim 1,
wherein the electrolyte is a gel-like electrolyte in which the electrolytic solution is retained by the resin.

12. The battery according to claim 1, further comprising:
an electrode body in which the electrolyte is formed on both surfaces of at least one electrode of the positive electrode and the negative electrode, or on at least one surface of both surfaces of the separator,
wherein the electrode body is formed by laminating, or laminating and winding the positive electrode, the negative electrode, and the separator.

13. An electrolyte, comprising:
particles;
a resin; and
an electrolytic solution, wherein;
    a shape of the particles includes a plane,
    a plane rate of the particles is greater than 40% and equal to or less than 100%,
    and a refractive index of the particles is equal to or greater than 1.3 and less than 2.4.

14. A battery pack, comprising:
a battery,
wherein the battery comprises:
    a positive electrode;
    a negative electrode;
    a separator; and
    an electrolyte that contains particles, a resin, and an electrolytic solution,
    wherein:
        a shape of the particles includes a plane,
        a plane rate of the particles is greater than 40% and equal to or less than 100%, and
        a refractive index of the particles is equal to or greater than 1.3 and less than 2.4;
a control unit configured to control the battery; and
an exterior package that accommodates the battery on an inner side of the exterior package.

15. An electronic apparatus, comprising:
a battery,
wherein the battery comprises:
    a positive electrode;
    a negative electrode;
    a separator;
    an electrolyte that contains particles, a resin, and an electrolytic solution,
    wherein:
        a shape of the particles includes a plane,
        a plane rate of the particles is greater than 40% and equal to or less than 100%, and
        a refractive index of the particles is equal to or greater than 1.3 and less than 2.4, and
wherein electric power is supplied from the battery.

16. An electrically driven vehicle, comprising:
a battery,
wherein the battery comprises:
    a positive electrode;
    a negative electrode;
    a separator; and
    an electrolyte that contains particles, a resin, and an electrolytic solution,
    wherein:
        a shape of the particles includes a plane,
        a plane rate of the particles is greater than 40% and equal to or less than 100%, and
        a refractive index of the particles is equal to or greater than 1.3 and less than 2.4;
a conversion device to which electric power is supplied from the battery, wherein the conversion device is configured to convert the electric power to a driving force of the electrically driven vehicle; and
a control device configured to process information related to vehicle control based on information about the battery.

17. An electrical storage device, comprising:
a battery,
wherein the battery comprises:
    a positive electrode;
    a negative electrode;
    a separator; and
    an electrolyte that contains particles, a resin, and an electrolytic solution,
    wherein:
        a shape of the particles includes a plane,
        a plane rate of the particles is greater than 40% and equal to or less than 100%, and
        a refractive index of the particles is equal to or greater than 1.3 and less than 2.4, and
wherein the electrical storage device is configured to supply electric power to an electronic apparatus that is connected to the battery.

18. The electrical storage device according to claim 17, further comprising:
an electric power information control device configured to transmit a first signal to and receive a second signal from other apparatuses via a network,
wherein charge and discharge control of the battery is performed based on information that is received by the electric power information control device.

19. An electric power system, comprising:
a battery,
wherein the battery comprises:
   a positive electrode;
   a negative electrode;
   a separator; and
   an electrolyte that contains particles, a resin, and an electrolytic solution,
   wherein:
      a shape of the particles includes a plane,
      a plane rate of the particles is greater than 40% and equal to or less than 100%, and
      a refractive index of the particles is equal to or greater than 1.3 and less than 2.4, and
wherein one of electric power is supplied from the battery, or the electric power is supplied to the battery from one of a power generator or a power network.

* * * * *